(12) United States Patent
Kimura et al.

(10) Patent No.: US 12,505,591 B2
(45) Date of Patent: Dec. 23, 2025

(54) SCATTERING TOMOGRAPHY DEVICE AND SCATTERING TOMOGRAPHY METHOD

(71) Applicant: Integral Geometry Science Inc., Kobe (JP)

(72) Inventors: Noriaki Kimura, Hyogo (JP); Kenjiro Kimura, Hyogo (JP)

(73) Assignee: INTEGRAL GEOMETRY SCIENCE INC., Hyogo (JP)

( * ) Notice: Subject to any disclaimer, the term of this patent is extended or adjusted under 35 U.S.C. 154(b) by 966 days.

(21) Appl. No.: 17/640,159

(22) PCT Filed: Jul. 28, 2020

(86) PCT No.: PCT/JP2020/028886
§ 371 (c)(1),
(2) Date: Mar. 3, 2022

(87) PCT Pub. No.: WO2021/053971
PCT Pub. Date: Mar. 25, 2021

(65) Prior Publication Data
US 2022/0319067 A1 Oct. 6, 2022

(30) Foreign Application Priority Data
Sep. 17, 2019 (JP) .................. 2019-168675

(51) Int. Cl.
*G06T 11/00* (2006.01)
*A61B 5/05* (2021.01)

(52) U.S. Cl.
CPC .............. *G06T 11/005* (2013.01); *A61B 5/05* (2013.01); *G06T 2210/41* (2013.01)

(58) Field of Classification Search
None
See application file for complete search history.

(56) References Cited

U.S. PATENT DOCUMENTS

| 4,805,627 A | 2/1989 | Klingenbeck et al. |
| 2008/0123083 A1* | 5/2008 | Wang .................. A61B 5/0091 356/73 |

(Continued)

FOREIGN PATENT DOCUMENTS

| JP | 62-66145 | 3/1987 |
| JP | 2005-323657 | 11/2005 |

(Continued)

OTHER PUBLICATIONS

Sollip Kwon et al., "Recent Advances in Microwave Imaging for Breast Cancer Detection", International Journal of Biomedical Imaging, vol. 2016, Jan. 2016, pp. 1-25, XP055364408.

(Continued)

*Primary Examiner* — Darryl V Dottin
(74) *Attorney, Agent, or Firm* — Wenderoth, Lind & Ponack, L.L.P.

(57) ABSTRACT

A scattering tomography device includes: a transmitting antenna that transmits radio waves into an interior of an object; a receiving antenna that receives, outside the object, scattered waves of the radio waves; and an information processing circuit that obtains measurement results over a plurality of days and generates a reconstructed image showing a persistent element inside the object based on the measurement results. The information processing circuit calculates a scattering field function for each of the measurement results, calculates a visualization function for each of the measurement results, generates intermediate images for the measurement results, and generates a reconstructed image by calculating a minimum value of an image intensity at each position in the intermediate images using a logical conjunction.

11 Claims, 20 Drawing Sheets

(56) References Cited

U.S. PATENT DOCUMENTS

| | | | |
|---|---|---|---|
| 2015/0377778 A1 | 12/2015 | Kimura et al. | |
| 2016/0292855 A1* | 10/2016 | Metzger | G06T 7/0012 |
| 2016/0377557 A1 | 12/2016 | Kimura et al. | |
| 2018/0308259 A1 | 10/2018 | Kimura et al. | |

FOREIGN PATENT DOCUMENTS

| | | |
|---|---|---|
| WO | 2014/125815 | 8/2014 |
| WO | 2015/136936 | 9/2015 |
| WO | 2017/057524 | 4/2017 |

OTHER PUBLICATIONS

Emily Porter et al., "Study of Daily Tissue Changes through Breast Monitoring with Time-Domain Microwave Radar", 2015 9th European Conference on Antennas and Propagation (EUCAP), Apr. 2015, pp. 1-5, XP033212460.

Jeremie Bourqui et al., "Bulk Permittivity Variations in the Human Breast over the Menstrual Cycle", 2017 11th European Conference on Antennas and Propagation (EUCAP), EURAAP, Mar. 2017, pp. 3476-3479, XP033097666.

Kenjiro Kimura et al., "Inverse Scattering filed theory", Integral Geometry Science Inc., Jan. 8, 2021, pp. 1-12, XP093059366.

Extended European Search Report issued Sep. 20, 2023 in corresponding European Patent Application No. 20864902.0.

International Search Report (ISR) issued on Oct. 20, 2020 in International (PCT) Application No. PCT/JP2020/028886.

D. J. P. Ferguson and T. J. Anderson, "Morphological Evaluation of Cell Turnover in Relation to the Menstrual Cycle in the "Resting" Human Breast," Br. J. Cancer (1981) 44, pp. 177-181.

* cited by examiner

SCATTERING TOMOGRAPHY DEVICE AND SCATTERING TOMOGRAPHY METHOD

TECHNICAL FIELD

The present disclosure relates to a scattering tomography device and the like that generates a reconstructed image showing elements inside an object using scattered waves of radio waves.

BACKGROUND ART

Patent Literature (PTL) 1, PTL 2, and PTL 3 disclose techniques related to a scattering tomography device and the like that generates a reconstructed image showing elements inside an object using scattered waves of radio waves.

For example, with the technique described in PTL 1, a beam transmitted out from a microwave transmitter is incident on an inspection target, and the amplitude and phase of scattered beams are detected by a microwave detector. A distribution of the dielectric constant is then computed from the output signal of the microwave detector, and a section of the inspection object is imaged.

CITATION LIST

Patent Literature

[PTL 1] Japanese Unexamined Patent Application Publication No. S62-66145
[PTL 2] WO 2014/125815
[PTL 3] WO 2015/136936

SUMMARY OF INVENTION

Technical Problem

Unfortunately, it is not easy to generate a reconstructed image showing elements inside an object using scattered waves of radio waves such as microwaves. More specifically, when the state of the interior of an object is known, calculating data measured as scattered waves relative to radio waves incident on the object is easy as it is a forward problem. However, calculating the state of the interior of an object when it is the measurement data that is known is difficult as it is an inverse problem.

Even if the presence of an element inside an object can be identified using scattered waves, it is not easy to identify the characteristics of the element, for example, whether the element is persistent in the object or not. More specifically, if a persistent malignant tumor and other cells that randomly appear and disappear reflect radio waves in the same way, it is not easy to identify whether an element inside the human body is a malignant tumor or another cell using scattered waves.

In view of this, the present disclosure provides a scattering tomography device and the like that can generate a reconstructed image showing persistent elements in an object using scattered waves of radio waves.

Solution to Problem

A scattering tomography device according to one aspect of the present disclosure includes: a transmitting antenna that transmits radio waves into an interior of an object from outside the object; a receiving antenna that receives, outside the object, scattered waves of the radio waves transmitted into the interior of the object by the transmitting antenna; and an information processing circuit that obtains a measurement result of the scattered waves on each of a plurality of days to obtain measurement results over a plurality of days, and generates a reconstructed image showing a persistent element inside the object based on the measurement results. The information processing circuit: calculates, for each of the measurement results and using the measurement result as a boundary condition, a scattering field function that takes a transmission position of the radio waves and a reception position of the scattered waves as inputs and outputs an amount of the scattered waves at the reception position; calculates, for each of the measurement results, a visualization function that takes a location to be visualized as an input and outputs an image intensity at the location to be visualized, and is defined based on the amount output from the scattering field function in response to inputting the location to be visualized into the scattering field function as the transmission position and the reception position; generates an intermediate image for each of the measurement results based on the visualization function to generate intermediate images for the measurement results; and generates the reconstructed image by calculating a minimum value of the image intensity at each position in the intermediate images using a logical conjunction.

These general or specific aspects may be implemented as a system, a device or apparatus, a method, an integrated circuit, a computer program, or a non-transitory computer-readable recording medium such a CD-ROM, or any combination thereof.

Advantageous Effects of Invention

According to one aspect of the present disclosure, it is possible to generate a reconstructed image showing persistent elements in an object using scattered waves of radio waves.

DESCRIPTION OF EMBODIMENTS

Figure 1:
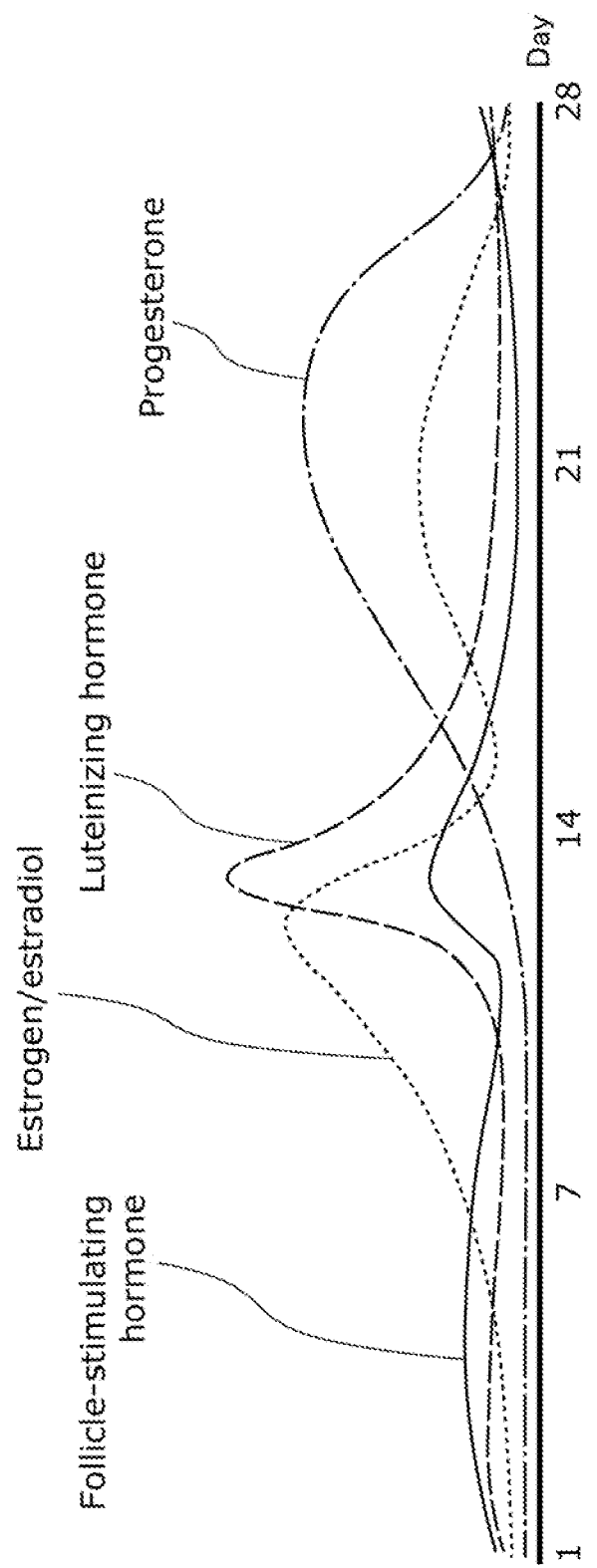
FIG. 1 is a graph illustrating the secretion of progesterone and other hormones during the menstrual cycle.

A scattering tomography device according to one aspect of the present disclosure includes: a transmitting antenna that transmits radio waves into an interior of an object from outside the object; a receiving antenna that receives, outside the object, scattered waves of the radio waves transmitted into the interior of the object by the transmitting antenna; and an information processing circuit that obtains a measurement result of the scattered waves on each of a plurality of days to obtain measurement results over a plurality of days, and generates a reconstructed image showing a persistent element inside the object based on the measurement results. The information processing circuit: calculates, for each of the measurement results and using the measurement result as a boundary condition, a scattering field function that takes a transmission position of the radio waves and a reception position of the scattered waves as inputs and outputs an amount of the scattered waves at the reception position; calculates, for each of the measurement results, a visualization function that takes a location to be visualized as an input and outputs an image intensity at the location to be visualized, and is defined based on the amount output from the scattering field function in response to inputting the location to be visualized into the scattering field function as the transmission position and the reception position; generates an intermediate image for each of the measurement results based on the visualization function to generate intermediate images for the measurement results; and generates the reconstructed image by calculating a minimum value of the image intensity at each position in the intermediate images using a logical conjunction.

This enables the scattering tomography device to calculate an intermediate image that can show elements inside the object, based on the scattering field functions calculated using the measurement results of the scattered waves as boundary conditions. The scattering tomography device can then generate a reconstructed image showing persistent elements inside the object from a plurality of intermediate images obtained using the plurality of measurements taken over a plurality of days.

Accordingly, the scattering tomography device can generate a reconstructed image showing persistent elements in the object using scattered waves of radio waves. This makes it possible to identify, for example, whether an element inside the human body is a persistent malignant tumor or other cells that randomly appear and disappear using scattered waves.

For example, the information processing circuit generates the reconstructed image using $P_N(r)=b_1(r) \wedge b_2(r) \wedge \ldots \wedge b_N(r)$, where $P_N(r)$ is the reconstructed image, r is a position, N is a total number of the intermediate images, $b_i$ is the visualization function where i is 1 to N, and $\wedge$ is the logical conjunction.

This enables the scattering tomography device to simply generate the reconstructed image by logical conjunctions of the intermediate images corresponding to the outputs of the visualization functions.

For example, the information processing circuit: generates the intermediate image based on the visualization function and a diffusion coefficient; and when generating the intermediate image, increases a spatial scope of diffusion of the image intensity at the location to be visualized in the intermediate image as the diffusion coefficient increases.

This enables the scattering tomography device to diffuse the image intensity using a diffusion coefficient. Accordingly, using the diffusion coefficient, the scattering tomography device can inhibit persistent elements from disappearing from the reconstructed image due to a shift in the measurement of the scattered waves.

For example, the information processing circuit generates the reconstructed image using $P_N(r)=e^{v\Delta}b_1(r) \wedge e^{v\Delta}b_2(r) \wedge \ldots \wedge e^{v\Delta}b_N(r)$, where $P_N(r)$ is the reconstructed image, r is a position, N is a total number of the intermediate images, $b_i$ is the visualization function where i is 1 to N, $e^{v\Delta}b_i(r)$ is the intermediate image where i is 1 to N, v is the diffusion coefficient, $\Delta$ is a two-dimensional Laplace operator corresponding to two directions in which a shift occurs in the measurement of the scattered waves, and $\wedge$ is the logical conjunction.

This enables the scattering tomography device to properly diffuse the image intensity using a relational expression based on a probability theory method.

For example, the information processing circuit calculates $e^{v\Delta}b_i(r)$ by calculating a Fourier transform of $b_i(r)$, multiplying a result of the Fourier transform by $\exp(-v(k_x^2+k_y^2))$, and calculating an inverse Fourier transform of a result of the multiplication of $\exp(-v(k_x^2+k_y^2))$, where $k_x$ and $k_y$ in $\exp(-v(k_x^2+k_y^2))$ are two wavenumbers corresponding to the two directions of $b_i$.

This enables the scattering tomography device to rapidly and properly diffuse the image intensity.

For example, the diffusion coefficient is defined as a value proportional to a mean squared error of measurement positions of the scattered waves.

This enables the diffusion coefficient to be defined based on the magnitude of the error in the measurement position. The scattering tomography device can then appropriately diffuse the image intensity based on the magnitude of the error in the measurement position.

For example, the diffusion coefficient is defined as a value equal to a mean squared error of measurement positions of the scattered waves.

This enables the diffusion coefficient to be simply defined based on the magnitude of the error in the measurement position. The scattering tomography device can then appropriately diffuse the image intensity based on the magnitude of the error in the measurement position.

For example, the diffusion coefficient is defined as zero.

This enables the scattering tomography device to simply generate the reconstructed image by logical conjunctions of the intermediate images corresponding to the outputs of the visualization functions, just like when a diffusion coefficient is not used.

For example, the diffusion coefficient is defined as a value greater than zero.

This enables the scattering tomography device to diffuse the image intensity more reliably using a diffusion coefficient greater than zero. Accordingly, by using a diffusion coefficient greater than zero, the scattering tomography device can more reliably inhibit persistent elements from disappearing from the reconstructed image due to a shift in the measurement of the scattered waves.

For example, in a three-dimensional space of X coordinates, Y coordinates, and Z coordinates, an X coordinate and a Z coordinate of a position of the transmitting antenna are identical to an X coordinate and a Z coordinate of a position of the receiving antenna, respectively, the scattering field function is defined as:

[Math. 1]

$$\varphi(x, y_1, y_2, z, k) = \frac{1}{(2\pi)^3} \int_{-\infty}^{\infty} \int_{-\infty}^{\infty} \int_{-\infty}^{\infty} e^{-i(k_x x + k_{y_1} y_1 + k_{y_2} y_2)}$$

$$a(k_x, k_{y_1}, k_{y_2}) e^{i\left\{\left(\sqrt{k^2-k_{y_1}^2}+\sqrt{k^2-k_{y_2}^2}\right)^2 - k_x^2\right\} z} dk_x dk_{y_1} dk_{y_2}$$

where x is an X coordinate of the transmission position and the reception position, $y_1$ is a Y coordinate of the transmission position, $y_2$ is a Y coordinate of the reception position, z is a Z coordinate of the transmission position and the reception position, k is a wavenumber of the radio waves, and $k_x$, $k_{y_1}$, and $k_{y_2}$ in the scattering field function are wavenumbers related to x, $y_1$, and $y_2$ in the scattering field function, respectively, $a(k_x, k_{y_1}, k_{y_2})$ is defined as:

[Math. 2]

$$a(k_x, k_{y_1}, k_{y_2}) = \sum_I e^{ik_x x_I} e^{-i\left\{\left(\sqrt{k^2-k_{y_1}^2}+\sqrt{k^2-k_{y_2}^2}\right)^2 - k_x^2\right\} z_I} \Phi(x_I, k_{y_1}, k_{y_2}, k)$$

where I is an index of the transmission position and the reception position at which the transmitting antenna and the receiving antenna are present, $x_I$ is an X coordinate of the transmission position and the reception position at which the transmitting antenna and the receiving antenna are present, and $z_f$ is a Z coordinate of the transmission position and the reception position at which the transmitting antenna and the receiving antenna are present, $$\tilde{\Phi}(x, k_{y_1}, k_{y_2}, k) \qquad \text{[Math. 3]}$$

expresses a Fourier transform image related to $y_1$, $y_2$, and t in $\Phi(x, y_1, y_2, t)$ expressing a measurement result at x, $y_1$, $y_2$, and t, and
the visualization function is defined as:

[Math. 4]

$$\rho(r) = \rho(x, y, z)$$

$$= \int_0^\infty \varphi(x, y, y, z, k) dk$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)} a(k_x, k_{y_1}, k_{y_2})$$

$$e^{i\left\{\left(\sqrt{k^2-k_{y_1}^2}+\sqrt{k^2-k_{y_2}^2}\right)^2-k_x^2\right\}z} dk_x dk_{y_1} dk_{y_2} dk$$

where x, y, and z in the visualization function are an X coordinate, a Y coordinate, and a Z coordinate of the location to be visualized, respectively.

This enables the scattering tomography device to properly generate intermediate images based on the above scattering field function and the above visualization function which are defined based on the fact that the X coordinate and the Z coordinate of the position of the transmitting antenna are the same as the X coordinate and the Z coordinate of the position of the receiving antenna.

A scattering tomography method according to one aspect of the present disclosure includes: transmitting, by a transmitting antenna, radio waves into an interior of an object from outside the object; receiving outside the object, by a receiving antenna, scattered waves of the radio waves transmitted into the interior of the object by the transmitting antenna; and obtaining a measurement result of the scattered waves on each of a plurality of days to obtain measurement results over a plurality of days, and generating a reconstructed image showing a persistent element inside the object based on the measurement results. The obtaining of measurement results and generating of a reconstructed image includes: calculating, for each of the measurement results and using the measurement result as a boundary condition, a scattering field function that takes a transmission position of the radio waves and a reception position of the scattered waves as inputs and outputs an amount of the scattered waves at the reception position; calculating, for each of the measurement results, a visualization function that takes a location to be visualized as an input and outputs an image intensity at the location to be visualized, and is defined based on the amount output from the scattering field function in response to inputting the location to be visualized into the scattering field function as the transmission position and the reception position; generating an intermediate image for each of the measurement results based on the visualization function to generate intermediate images for the measurement results; and generating the reconstructed image by calculating a minimum value of the image intensity at each position in the intermediate images using a logical conjunction.

This makes it possible to calculate an intermediate image that can show elements inside the object, based on the scattering field functions calculated using the measurement results of the scattered waves as boundary conditions. It is then possible to generate a reconstructed image showing persistent elements inside the object from a plurality of intermediate images obtained using a plurality of measurements taken over a plurality of days.

Accordingly, it is possible to generate a reconstructed image showing persistent elements in the object using scattered waves of radio waves. This makes it possible to identify, for example, whether an element inside the human body is a persistent malignant tumor or other cells that randomly appear and disappear using scattered waves.

Hereinafter, embodiments will be described with reference to the drawings. Each of the following embodiments describes a general or specific example. The numerical values, shapes, materials, elements, the arrangement and connection of the elements, steps, the order of the steps etc., presented in the following embodiments are mere examples, and do not limit the scope of the claims.

Embodiment

The scattering tomography device according to the present embodiment generates a reconstructed image showing persistent elements in the object using scattered waves of radio waves. Hereinafter, the scattering tomography device according to the present embodiment will be described in detail, including the underlying techniques and theories. Hereinafter, the techniques will be described using microwave mammography as a main example, where the radio waves are exemplified as microwaves, and the object is exemplified as a breast, but the field of application is not limited to microwave mammography; radio waves other than microwaves and objects other than a breast may be used.

I. Outline

The present disclosure provides a method of identifying a malignant tumor or the like using time series probability theory, or a method of confirming the absence of a tumor or the like using time series probability theory.

For example, measurement is performed a plurality of times on a person with a menstrual cycle. Then, using a time series probability theory method, images showing a long-term or mid-term stable element in a breast are extracted from the results of the plural measurements. More specifically, for example, a three-dimensional (3D) image showing an element in a breast is obtained from a single measurement result based on scattering field theory. A plurality of 3D images are obtained from the plural measurement results. A final reconstructed image is obtained from the time series data of these images using a stochastic partial differential equation (also called a time series stochastic partial differential equation).

The time series probability theory method in the present disclosure is an analytical method based on a stochastic partial differential equation. The time series probability theory method may be combined with a known scattering field theory. More specifically, the time series probability theory method in the present disclosure may be combined with the scattering field theory described in PTL 2 or PTL 3 listed above.

To date, the inventors have conducted clinical experiments based on a combination of scattering field theory and the time series probability theory method on a total of five individuals ranging in age from the early 20s to the late 40s. Some of the 3D images obtained by performing a single measurement on each individual showed some sort of element in the breast, but all were completely free of malignancy.

Microwave mammography based on scattering field theory produces high resolution and high contrast images of the element to be visualized. Typically, this element to be visualized is a cell that appears and disappears in a short period of time, or a tumor that remains stable over the long and medium term (or a monotonically growing tumor). The combination of scattering field theory and the time series probability theory method is particularly effective in simple situations where the element to be visualized is one of the above, and forms a powerful diagnostic technique in practice.

II. Underlying Physiological Background Knowledge and Considerations

FIG. 1 is a graph illustrating the secretion of progesterone and other hormones during the menstrual cycle.

Cell multiplication (mitosis) and cell deletion (apoptosis) occur inside the human breast. Cell multiplication (mitosis) and cell deletion (apoptosis) are assumed to be dependent on the hormonal environment associated with the menstrual cycle, i.e., the amount of estrogen and progesterone secreted.

Figure 2A:
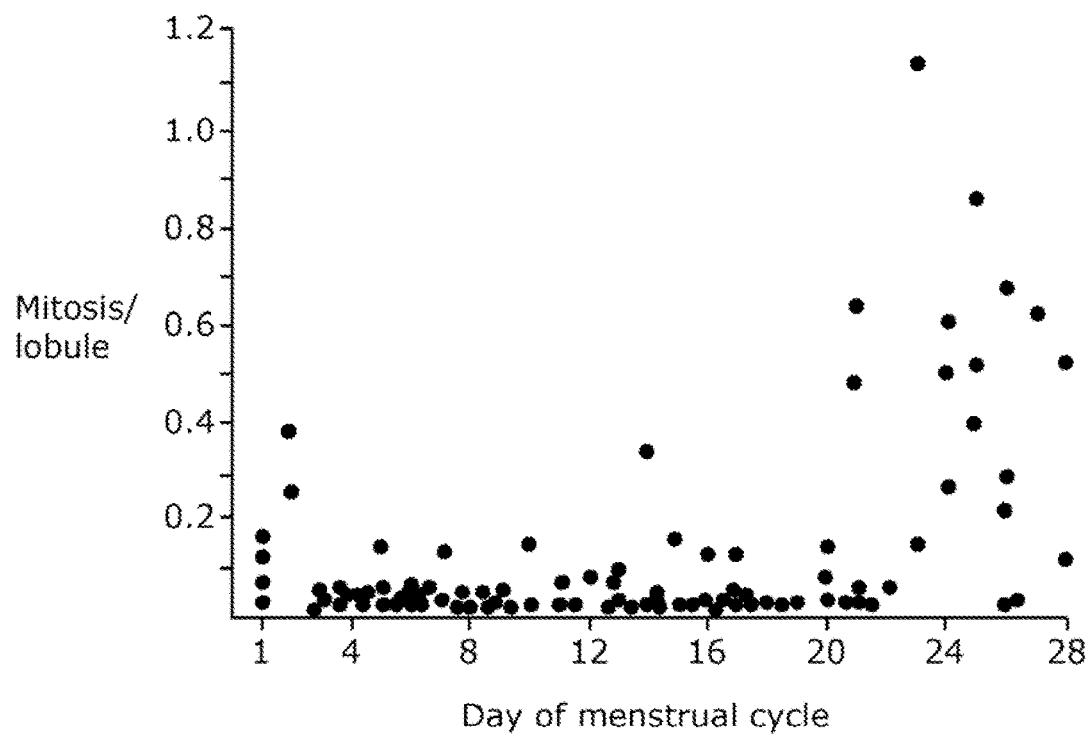
FIG. 2A is a graph illustrating the frequency of cell multiplication (mitosis) of the lobules plotted against day of the menstrual cycle.
Figure 2B:
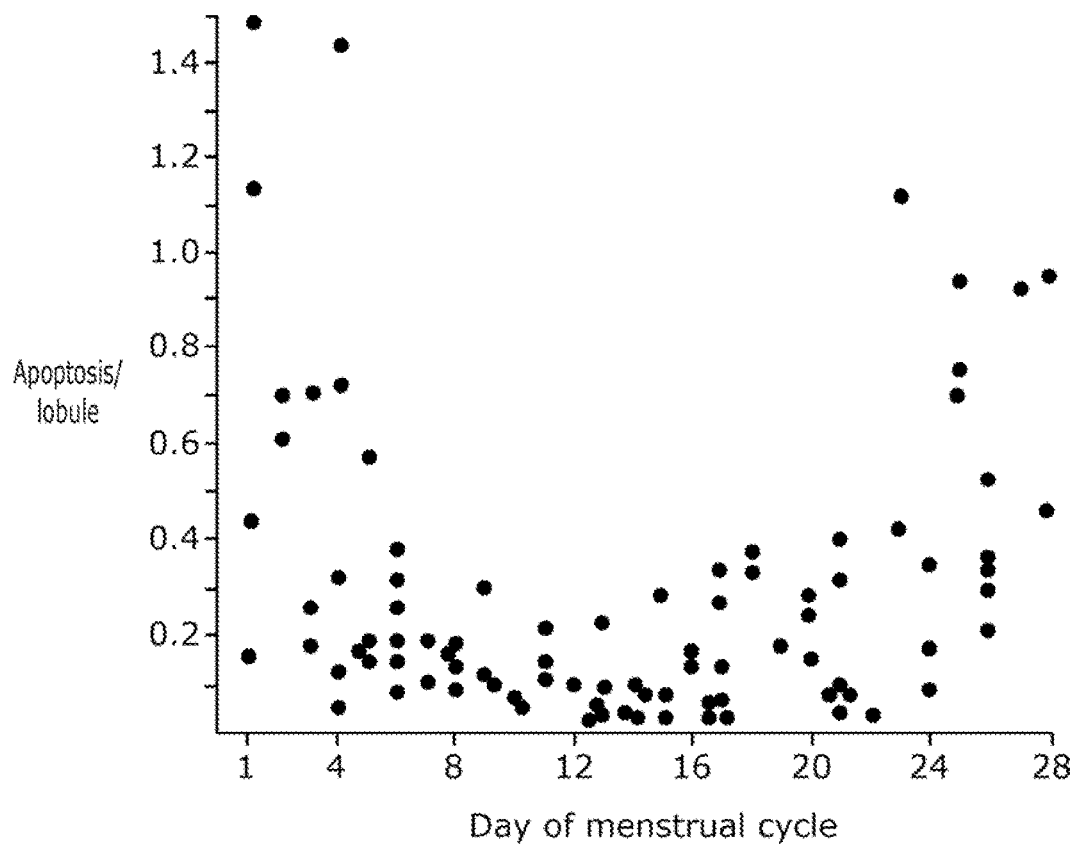
FIG. 2B is a graph illustrating the frequency of cell deletion (apoptosis) plotted against day of the menstrual cycle.

FIG. 2A is a graph illustrating the frequency of cell multiplication (mitosis) of the lobules plotted against day of the menstrual cycle. FIG. 2B is a graph illustrating the frequency of cell deletion (apoptosis) plotted against day of the menstrual cycle.

FIG. 2A and FIG. 2B are based on D. J. P. Ferguson and T. J. Anderson (1981), "Morphological evaluation of cell turnover in relation to the menstrual cycle in the "resting" human breast", Br. J. Cancer 44:177 (Non Patent Literature).

Figure 3:
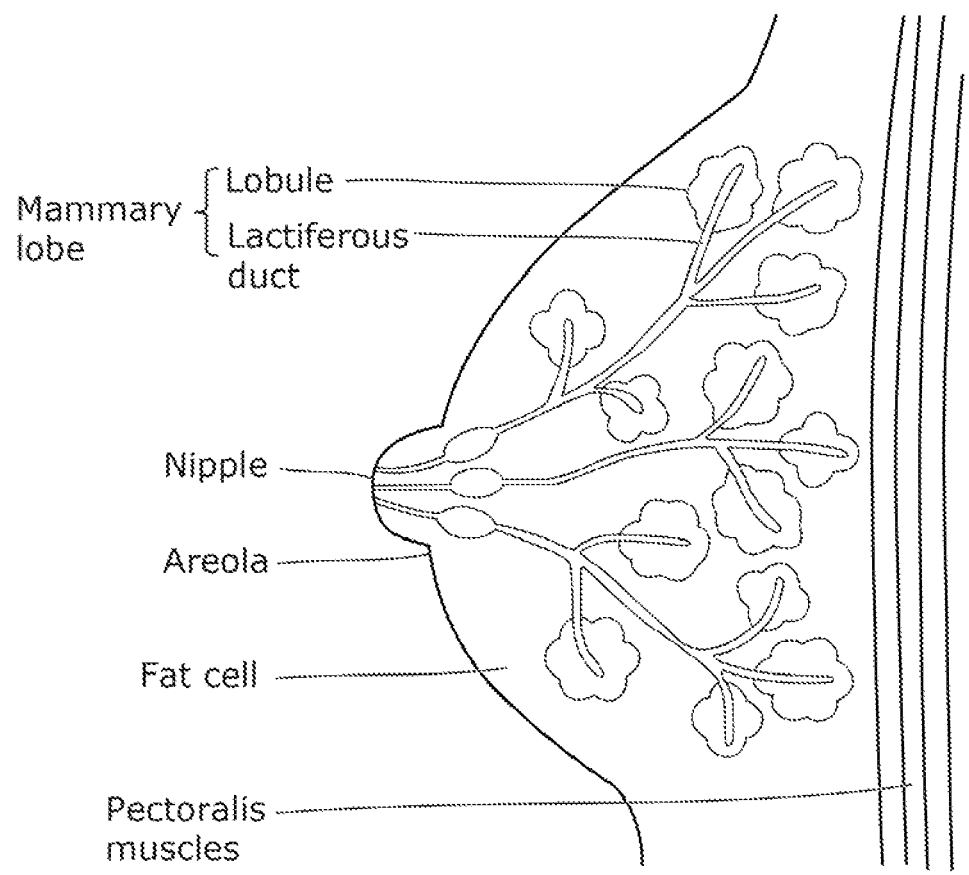
FIG. 3 is a schematic diagram illustrating lobules and lactiferous ducts.

FIG. 3 is a schematic diagram illustrating lobules and lactiferous ducts. A mammary gland includes multiple mammary lobes. The mammary lobes further include lobules and lactiferous ducts. The lobules produce milk, and the lactiferous ducts carry the milk to the nipple.

As illustrated in FIG. 2A, the frequency of cell multiplication in the lobules increases as the days progress toward the end of the menstrual cycle in particular. The frequency of cell multiplication in the lobules is high on the 25th day of the 28-day menstrual cycle. This higher number is associated with an increase in the number of lobules.

Lobular cell multiplication also affects measurement results obtained by microwave mammography. An increase in the number of lobules with high dielectric constant is an obvious obstacle in the detection of malignancy. On the other hand, as FIG. 2A illustrates, cell multiplication is not as active on days 4 to 19 of the menstrual cycle, making this period more suitable for measurement via microwave mammography. In practice, however, some signal reflection from the lobule is still observed during this period, and this signal reflection is an obstacle to the detection of small tumors.

Moreover, cell multiplication (mitosis) and cell deletion (apoptosis) occur in short periods of time during the menstrual cycle, and the phenomenon can occur anywhere in a fairly large area of the breast. The lobules produced by such phenomena appear as rather strong, localized signals in the measurement results obtained by microwave mammography.

There is randomness in where lobular cell multiplication occurs, and lobular cell multiplication is a localized (discrete) phenomenon rather than a phenomenon that occurs uniformly throughout the breast. Stated differently, lobule cells are assumed to appear and disappear locally and randomly.

The elements to be visualized by microwave mammography are assumed to be lobular cells that randomly appear and disappear, or tumors that do not die for a long period of time once they form (including benign tumors such as fibroadenomas). With the time series probability theory method according to the present disclosure, tumors and the like are extracted by taking full advantage of these differences.

The time series probability theory method is a powerful method that greatly outperforms the methods described above that target specific periods in the menstrual cycle. With regard to young people with a menstrual cycle, the experiments reliably determined whether they were healthy or not, even with only a few time series measurements.

It is difficult to apply this time series probability theory method to intra-mammary measurement techniques other than microwave mammography, because collagen and other factors are strongly and stably visualized over the long term in the images of X-ray mammography. In ultrasound echo devices, measurements are made by manually matching mechanical impedances, which makes it extremely difficult to improve reproducibility, and there are many reflections from the long-term stable layer boundaries in the breast. Application is difficult also because the layer boundaries in the breast change shape freely during measurement.

There are also many challenges in applying the time series probability theory method to magnetic resonance imaging (MRI) or positron emission tomography (PET) measurements.

III. Scattering Field Theory Outline (Theory of Multistatic Inverse Scattering on Curved Surfaces)

In this section, a scattering field theory for analyzing measurement results and obtaining 3D images will be presented. The 3D images obtained by the scattering field theory are analyzed using a stochastic partial differential equation in the next step. The scattering field theory disclosed in PTL 2 or PTL 3 may be applied as appropriate.

Figure 4:
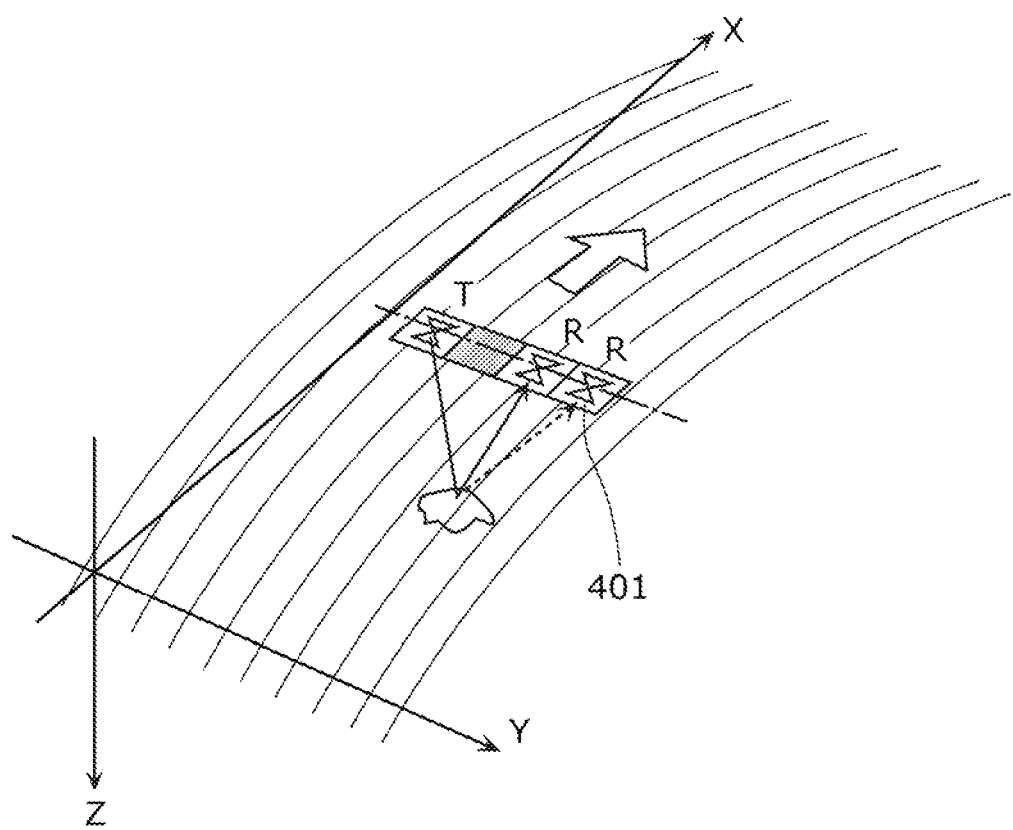
FIG. 4 is a schematic diagram illustrating an example of an antenna array scanning on a curved surface to measure scattered data according to an embodiment of the present disclosure.

FIG. 4 is a schematic diagram illustrating an example of an antenna array scanning on a curved surface to measure scattered data. Antenna array 401 is a multistatic antenna array that scans on a curved surface and includes transmitting antenna T and receiving antennas R. There are many variations of scattering field theory corresponding to multistatic antenna arrays that scan on a curved surface (also called theory of multistatic inverse scattering on curved surfaces).

The surface used as an example here in scattering field theory is a relatively simple surface with finite curvature in the x direction and zero curvature in the y direction. In this example, antenna array 401 is arranged in a straight line in the y direction and scans along the curve in the x direction.

Antenna arrays 401 are arranged in a straight line with the same X coordinate. Of the two orthogonal principal curvature directions on the curved surface with zero Gaussian curvature, the y direction with zero curvature is the direction in which transmitting antenna T and receiving antennas R of antenna array 401 are aligned, and the x direction is the antenna scanning direction. This example is quite generic and practical in its application to microwave mammography.

Note that antenna array 401 may include a plurality of transmitting antennas T and may include a plurality of receiving antennas R.

The radio wave emitted from point $P_1(x, y_1, z)$ is reflected at point $P(\xi, \eta, \zeta)$ and received at point $P_2(x, y_2, z)$. When point P is located at any position in the entire domain D, the signal received at point $P_2$ is expressed as shown in (3-1) below.

[Math. 5]

$$\varphi(x, y_1, y_2, z, \omega) = \iint_D \frac{e^{ik\rho_1}}{\rho_1} \frac{e^{ik\rho_2}}{\rho_2} \varepsilon(\xi, \eta, \zeta) d\xi d\eta d\zeta \quad (3\text{-}1)$$

$$\rho_1 = \sqrt{(x-\xi)^2 + (y_1-\eta)^2 + (z-\zeta)^2}$$

$$\rho_2 = \sqrt{(x-\xi)^2 + (y_2-\eta)^2 + (z-\zeta)^2}$$

In (3-1), the time factor is assumed to be proportional to $\exp(-i\omega t)$. Here, $\omega$ is the angular frequency of the radio wave, k is the frequency of the radio wave, $\in(\xi, \eta, \zeta)$ is the reflectivity at $P(\xi, \eta, \zeta)$. Moreover, $\omega = ck$ holds true. Here, c is the propagation speed of the radio wave. The function in (3-1) can also be expressed as a scattering field function. As long as $\in(\xi, \eta, \zeta)$ is unknown, the scattering field function in (3-1) is unknown.

The scattering field function in (3-1) can be interpreted as a function that takes an arbitrary transmission position and an arbitrary reception position having the same x and z coordinates as inputs and outputs the amount of scattered waves at the reception position. If the transmission position and the reception position input into the scattering field function respectively match the position of transmitting antenna T and the position of receiving antenna R, the output of the scattering field function will match the measurement data obtained from receiving antenna R.

When $t \to 0$, $x \to x$, $y1 \to y2$ (=y), and $z \to z$ are applied to the scattering field function, after transmitting radio waves, the scattering field function is assumed to indicate the amount of scattered waves that are instantaneously received at (x, y, z), i.e., the amount of reflection at (x, y, z).

More specifically, for example, the value output as the amount of scattered waves from the scattering field function by inputting the same arbitrary position for the transmission and reception positions into the scattering field function is assumed to be larger for larger reflections at that position. In other words, by inputting the same arbitrary position for the transmission and reception positions into the scattering field function, the value output from the scattering field function can indicate the amount of reflection at that position. A visualization function for generating an image of the interior of an object is derived as a function indicating such a quantity as follows.

The equation in (3-2) shown below is an equation that the scattering field function in (3-1) satisfies.

[Math. 6]

$$\left\{\Delta_4^2 - \frac{4}{c^2}(\partial_t^2 \partial_x^2 + \partial_t^2 \partial_z^2) - 4\partial_{y_1}^2 \partial_{y_2}^2 \right\}\varphi = 0 \quad (3\text{-}2)$$

$$\Delta_4 = \partial_x^2 + \partial_{y_1}^2 + \partial_{y_2}^2 + \partial_z^2$$

The equation shown in (3-3) is obtained as a general solution to the equation shown in (3-2). Stated differently, the equation in (3-3) is obtained as the scattering field function.

[Math. 7]

$$\varphi(x, y_1, y_2, z, k) = \frac{1}{(2\pi)^3} \int_{-\infty}^{\infty}\int_{-\infty}^{\infty}\int_{-\infty}^{\infty} e^{-i(k_x x + k_{y_1} y_1 + k_{y_2} y_2)} \quad (3\text{-}3)$$

$$a(k_x, k_{y_1}, k_{y_2}) e^{i\left\{\left(\sqrt{k^2-k_{y_1}^2} + \sqrt{k^2-k_{y_2}^2}\right)^2 - k_x^2\right\}z} dk_x dk_{y_1} dk_{y_2}$$

Here, $k_x$, $k_{y1}$, and $k_{y2}$ are wavenumbers of the scattering field function for x, $y_1$, and $y_2$, respectively. When the scattered data (i.e., the measurement result) measured on the boundary of the region to be measured is expressed as $\Phi(x, y_1, y_2, t)$, and the Fourier transform image of $\Phi(x, y_1, y_2, t)$ for $y_1$, $y_2$, and t is expressed as:

$$\tilde{\Phi}(x, k_{y_1}, k_{y_2}, k), \quad [\text{Math. 8}]$$

the equation in (3-4) shown below is obtained as $a(k_x, k_{y1}, k_{y2})$ in (3-3).

[Math. 9]

$$a(k_x, k_{y_1}, k_{y_2}) = \quad (3\text{-}4)$$

$$\sum_I e^{ik_x x_I} e^{-i\left\{\left(\sqrt{k^2-k_{y_1}^2} + \sqrt{k^2-k_{y_2}^2}\right)^2 - k_x^2\right\}z_I} \tilde{\Phi}(x_I, k_{y_1}, k_{y_2}, k)$$

In the above equation, $x_j$ represented by $x_I$ is the common X coordinate of transmitting antenna T and receiving antenna R, and $z_j$ represented by $z_I$ is the common Z coordinate of transmitting antenna T and receiving antenna R. $x_j$ and $z_j$ satisfy the relationship shown in (3-5) below. The function f in (3-5) is the function for the shape of the boundary surface.

[Math. 10]

$$z_j = f(x_j) \quad (3\text{-}5)$$

The equations in (3-3) and (3-4) constitute the scattering field function calculated using the measurement result as a boundary condition. Stated differently, (3-6) shown below is obtained as the final visualization function.

[Math. 11]

$$\rho(r) = \rho(x, y, z) \quad (3\text{-}6)$$

$$= \int_0^\infty \varphi(x, y, y, z, k) dk$$

$$= \frac{1}{(2\pi)^3} \int_0^\infty \int_{-\infty}^{\infty}\int_{-\infty}^{\infty}\int_{-\infty}^{\infty} e^{-i(k_x x + k_{y_1} y + k_{y_2} y)} a(k_x, k_{y_1}, k_{y_2})$$

$$e^{i\left\{\left(\sqrt{k^2-k_{y_1}^2} + \sqrt{k^2-k_{y_2}^2}\right)^2 - k_x^2\right\}z} dk_x dk_{y_1} dk_{y_2} dk$$

$\rho(r)$ is the image. More specifically, r is the location to be visualized, and $\rho(r)$ is the image intensity at that location to be visualized. The image intensity at the location to be visualized corresponds to the output of the scattering field function for the location to be visualized, i.e., the magnitude of the reflection at the location to be visualized. For example, because elements in the breast reflect radio waves, a high image intensity is obtained at the location of an element in the breast.

ρ(r) in (3-6) constitutes the random field described in the next section. Moreover, ρ(r) at $t=t_i$ that corresponds to the i-th measurement is written as $b_i(r)$.

IV. Stochastic Partial Differential Equation

IV-1. Time Series Measurement

Figure 5:
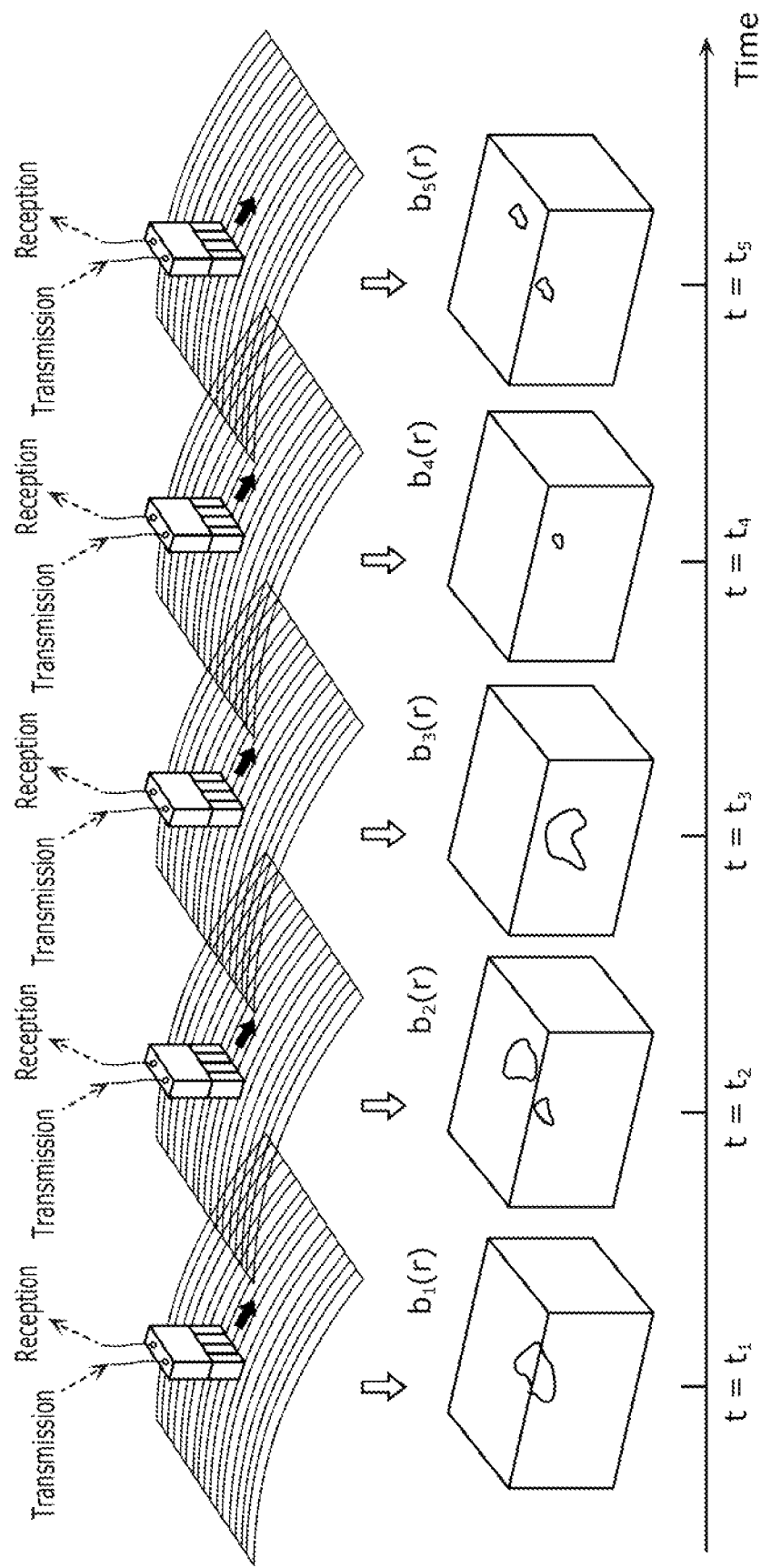
FIG. 5 is a schematic diagram illustrating time series measurements performed using microwave mammography according to an embodiment of the present disclosure.

FIG. 5 is a schematic diagram illustrating time series measurements (also referred to as time series 3D measurements) performed using microwave mammography on the same region of the same person.

The most standard method of time series measurement is to take one measurement every week for a total of four or five measurements over a period of four or five weeks, assuming that 28 days, which corresponds to the menstrual cycle, is equivalent to four weeks. The 3D image ρ(r) obtained in this manner is defined as $b_i(r)$ (e.g., i=1, 2, . . . , 5).

IV-2. Fundamental Equation

Temporal and spatial changes in image intensity are described by a stochastic partial differential equation such as shown in (4-1) below, where t is time, r=(x, y, z) is a three-dimensional vector, and ρ(t, r) is image intensity (specifically, time series stochastic image intensity).

[Math. 12]

$$\frac{\partial \rho(t, r)}{\partial t} = v\Delta\rho(t, r) + \sum_{i=1}^{N} \delta(t - t_i)\{\alpha b_i(r) \wedge \rho(t_{i-}, r) - \rho(t_{i-}, r)\} \quad (4\text{-}1)$$

$$\Delta = \frac{\partial^2}{\partial x^2} + \frac{\partial^2}{\partial y^2}$$

Here, v is the diffusion coefficient and corresponds to incoming noise at each measurement. The noise is assumed to be random and is caused by the measurement area shifting due to a shift in the scale position and/or a shift in the probe scanning. δ denotes the delta function. $\wedge$ is the symbol for logical conjunction, meaning the minimum value as shown in (4-2) below.

[Math. 13]

$$a \wedge b = \min\{a, b\} \quad (4\text{-}2)$$

$\rho(t_{i-}, r)$ in the equation in (4-1) implies a lower limit like that in (4-3) below.

[Math. 14]

$$\rho(t_{i-}, r) = \min_{\tau \to t_i - 0} \rho(\tau, r) \quad (4\text{-}3)$$

α is a constant that is dependent on v and $\Delta t = t_i - t_{i-1}$, and may be α=1. $b_i(r)$ denotes the stochastic image intensity at the position of spatial coordinate r at time $t_i$.

Stated differently, the first term on the right-hand side of the equation in (4-1) corresponds to a shift in the measurement area. The second term on the right-hand side of the equation in (4-1) corresponds to a change in image intensity during measurement, and corresponds to the difference (amount of change) between the fixed amount and total amount of image intensity. Temporal and spatial changes in image intensity correspond to the sum of these.

Figure 6:
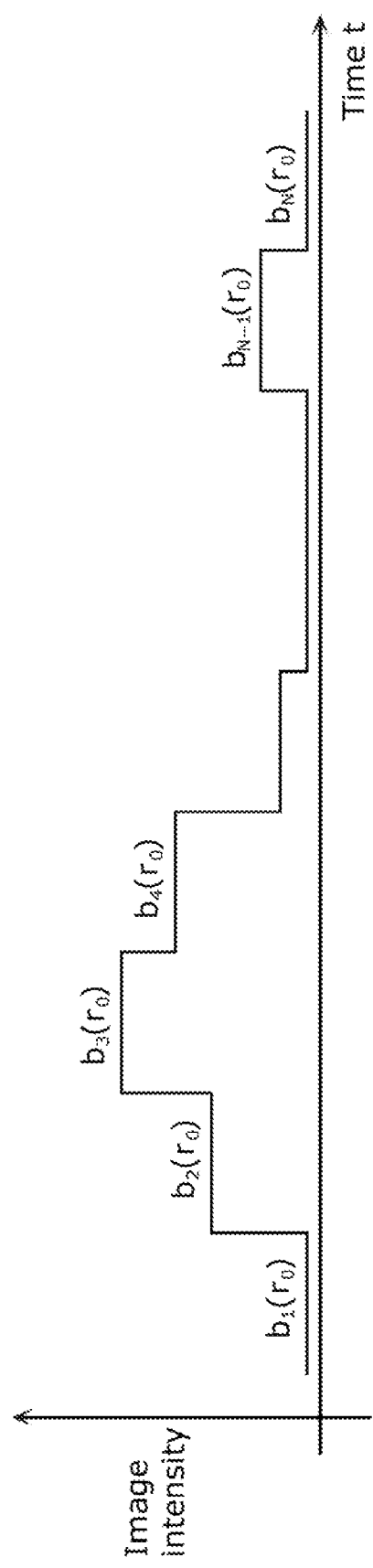
FIG. 6 is a graph illustrating time series data of image intensity according to an embodiment of the present disclosure.

FIG. 6 is a graph illustrating time series data of stochastic image intensity at $r=r_0$ and discrete $b_j(r_0)$ (j=1, 2, 3, . . . , N) at $r=r_0$. $b_i(r)$ is the image obtained from the i-th measurement in microwave mammography. In the scattering field theory described above, $b_i(r)$ is written as ρ(r). Stated differently, $b_i$ is the visualization function and $b_i(r)$ is the image obtained by the visualization function.

Integrating the stochastic partial differential equation given in (4-1) in the vicinity of $t=t_i$ yields the (4-4) shown below.

[Math. 15]

$$\int_{t_i - \Delta t}^{t_i} \left[ -\frac{\partial \rho(t, r)}{\partial t} + v\Delta\rho(t, r) + \sum_{i=1}^{N} \delta(t - t_i)\{\alpha b_i(r) \wedge \rho(t_{i-}, r) - \rho(t_{i-}, r)\} \right] dt = 0 \quad (4\text{-}4)$$

Performing the integration of (4-4) yields (4-5) shown below.

[Math. 16]

$$-\rho(t_i, r) + \rho(t_i - \Delta t, r) + \int_{t_i - \Delta t}^{t_i} v\Delta\rho(t, r)dt + \{\alpha b_i(r) \wedge \rho(t_{i-}, r) - \rho(t_{i-}, r)\} = 0 \quad (4\text{-}5)$$

If $\Delta t = t_i - t_{i-}$, (4-6) shown below holds true in the limit of $\Delta t \to 0$.

[Math. 17]

$$\lim_{\Delta t \to 0} \rho(t_i - \Delta t, r) = \rho(t_{i-}, r) \quad (4\text{-}6)$$

$$\lim_{\Delta t \to 0} \int_{t_i - \Delta t}^{t_i} v\Delta\rho(t, r)dt = 0$$

According to equation (4-5) and equation (4-6), the equation in (4-7) shown below holds true.

[Math. 18]

$$\rho(t_i, r) = \alpha b_i(r) \wedge \rho(t_{i-}, r) \quad (4\text{-}7)$$

When t is not in the vicinity of $t_i$, according to equation (4-1), the equation in (4-8) shown below holds true.

[Math. 19]

$$\frac{\partial \rho(t, r)}{\partial t} = v\Delta\rho(t, r) \quad (t_{i-1} < t < t_i) \quad (4\text{-}8)$$

IV-3. Solution to Stochastic Partial Differential Equation

The solution to the stochastic partial differential equation in (4-1) at singular points other than $t=t_i$ that is, the solution to (4-8) is obtained using the Fourier transform as shown in (4-9) below.

[Math. 20]

$$Q(t, k) = \tilde{\rho}(t, k_x, k_y, k_z) = \frac{1}{(2\pi)^3} \int_{-\infty}^{\infty} \int_{-\infty}^{\infty} \int_{-\infty}^{\infty} e^{-ik_x x - ik_y y - ik_z z} \rho(t, x, y, z) dx dy dz \quad (4-9)$$

Here, Q(t, k) is the Fourier transform image of ρ(t, r).

[Math. 21]

$$\tilde{\rho}(t, k_x, k_y, k_z)$$

Math. 21 is the Fourier transform image of ρ(t, x, y, z). $k_x$, $k_y$, and $k_z$ are the wavenumbers of x, y, and z, respectively. As shown in (4-9), k in Q(t, k) corresponds to ($k_x$, $k_y$, $k_z$). The differential equation shown in (4-10) below is obtained based on (4-8) and (4-9).

[Math. 22]

$$\frac{d}{dt}Q(t, k) + v(k_x^2 + k_y^2)Q(t, k) = 0 \quad (4-10)$$

The differential equation in (4-10) can be easily solved to obtain a solution like that in (4-11) below. Here, $c(k_x, k_y, k_z)$ corresponds to the value of Q(t, k) at $t=t_j \to t_i$, that is, at $Q(t_j, k)$ at the limit of $t_j \to t_i$.

[Math. 23]

$$Q(t, k) = c(k_x, k_y, k_z)e^{-v(k_x^2+k_y^2)(t-t_i)} \quad (4-11)$$

$$c(k_x, k_y, k_z) = \int_{-\infty}^{\infty} \int_{-\infty}^{\infty} \int_{-\infty}^{\infty} e^{-ik_x x - ik_y y - ik_z z} \alpha b_i(r) \wedge \rho(t_{i-}, r) dx dy dz$$

(4-12) shown below is obtained as a solution to the stochastic partial differential equation in (4-1) at singular points other than $t=t_i$, based on (4-11).

[Math. 24]

$$\rho(t, x, y, z) = \int_{-\infty}^{\infty} \int_{-\infty}^{\infty} \int_{-\infty}^{\infty} e^{-ik_x x - ik_y y - ik_z z} Q(t, k) dk_x dk_y dk_z = \quad (4-12)$$

$$\int_{-\infty}^{\infty} \int_{-\infty}^{\infty} \int_{-\infty}^{\infty} e^{-ik_x x - ik_y y - ik_z z} \left\{ e^{-v(k_x^2+k_y^2)(t-t_i)} \int_{-\infty}^{\infty} \int_{-\infty}^{\infty} \int_{-\infty}^{\infty} e^{-ik_x x - ik_y y - ik_z z} \alpha b_i(r) \wedge \rho(t_{i-}, r) dx dy dz \right\} dk_x dk_y dk_z$$

Applicable scope $t_i < t < t_{i+1}$ (i = 1, 2, 3, ... , N − 1)

V. Physical Meaning of Diffusion Term v

Figure 7:
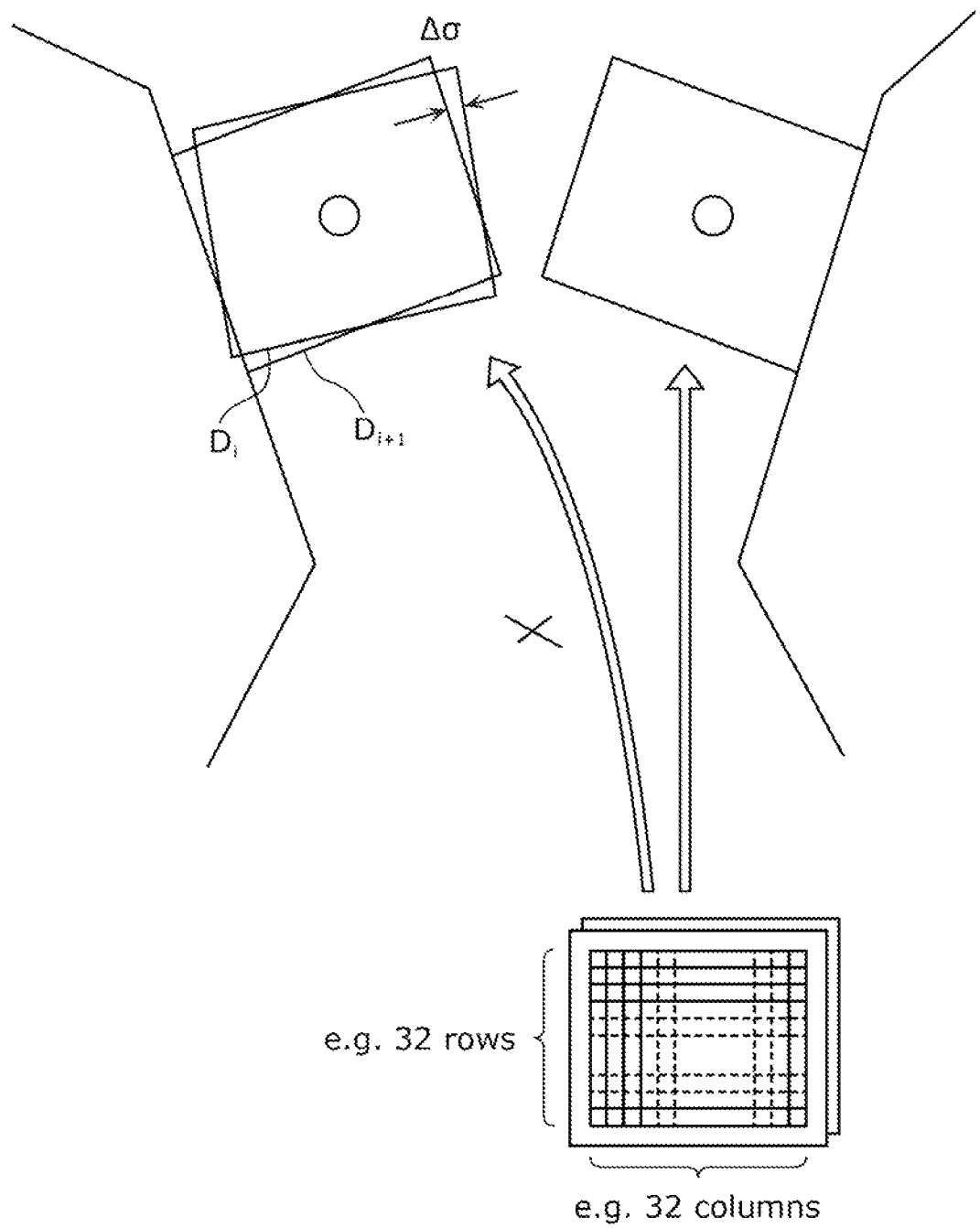
FIG. 7 is a schematic diagram illustrating a shift in the measurement area according to an embodiment of the present disclosure.

FIG. 7 is a schematic diagram illustrating a shift in the measurement area. For example, a thin, single-sided adhesive sticker is adhered to the specimen, and the measurement is performed on the surface of the adhered sticker. In other words, the area of the adhered sticker is used as the measurement area. For example, the sticker is made of a transparent or translucent material (specifically, a synthetic resin or the like) through which radio waves can pass. For example, a 32×32 grid is printed on the sticker, and the sticker is adhered so that the specimen's nipple or mole is positioned in the same square in the time series measurement.

Here, the measurement area in the time series measurement is expressed as $D_i$(i=1, 2, 3, . . . , N). Even when a sticker with a grid like described above is used, it is difficult to keep each $D_i$ in the same place on the specimen. There will be a shift every time. This shift is assumed to be random and is represented as a diffusion term.

For example, every Δt, the measurement area randomly shifts Δσ in the (x, y)-plane. Δσ may be expressed as Δσ=(σx, σy). Δσ may also correspond to a combination of rotation and a parallel displacement.

Since a shift in a two-dimensional plane occurs like described above, the Laplacian Δ in (4-8) is a two-dimensional operator. The fundamental solution of (4-8) regarding the shift of the measurement area is expressed as shown in (5-1) below.

[Math. 25]

$$\rho(t, x, y, z) = \frac{1}{4\pi v t} e^{-\frac{x^2+y^2}{4vt}} \quad (5-1)$$

The shift of the measurement area does not include a characteristic whereby the shift increases with the number of measurements. The measurement area shifts randomly with positional errors near approximately the same location. If we assume that the shift of the measurement area follows a normal distribution, it is similar to the well-known Brownian motion, so the distribution function of the shift of the measurement area is represented by a diffusion equation. If the reference position is expressed as $r_0$ and the particle position of the Brownian motion is expressed as r, the mean squared error of these is proportional to vt. This relationship can be expressed as shown in (5-2) below.

[Math. 26]

$$\langle (r-r_0)^2 \rangle \propto vt \quad (5-2)$$

As this shows, the shift of the measurement area does not include a characteristic whereby the shift increases with the number of measurements. Accordingly, t in (5-2) can be interpreted as representing the time from one measurement to the next. For example, it can be determined that one measurement time is t=0 and the next measurement time is t=1. In this case, (5-3) below is obtained from (5-2).

[Math. 27]

$$\langle (r-r_0)^2 \rangle \propto v \quad (5-3)$$

For example, it is possible to estimate diffusion coefficient v as the amount of shift of the measurement area between two measurements.

VI. Method for Discriminating between Tumor and Lobular Cells

The solution to (4-8) is formally determined as shown in (6-1) below.

[Math. 28]

$$\rho(t, r) = e^{(v\Delta)t} \rho(0, r) \quad (6-1)$$

The hypothetical time interval between each measurement in time series measurement is defined as $\delta t=1$ (i.e., $t_i-t_{i-1}=1$). Then, when the time series measurement image is expressed as $b_i(r)$ ($i=1, 2, 3, \ldots, N$), (6-2) shown below represents a time series measurement image that takes the error in the measurement area during measurement into consideration. Stated differently, (6-2) shown below represents a time series measurement image in which the image intensity at each position is diffused to its surroundings to account for errors in the measurement area during measurement.

[Math. 29]

$$e^{v\Delta}b_1(r), e^{v\Delta}b_2(r), e^{v\Delta}b_3(r), \ldots e^{v\Delta}b_N(r) \quad (6\text{-}2)$$

$e^{v\Delta}b_i(r)$ is obtained by calculating the Fourier transform of $b_i(r)$ for x, y, and z based on (4-12), multiplying that by $\exp(-v(k_x^2+k_y^2))$, and then calculating the inverse Fourier transform. In other words, $e^{v\Delta}b_i(r)$ is obtained by (6-3) shown below.

[Math. 30]

$$e^{v\Delta}b_i(x, y, z) = \quad (6\text{-}3)$$

$$\int_{-\infty}^{\infty}\int_{-\infty}^{\infty}\int_{-\infty}^{\infty} e^{ik_xx+ik_yy+ik_zz}\left\{e^{-v(k_x^2+k_y^2)}\tilde{b}_i(k_x, k_y, k_z)\right\}dk_xdk_ydk_z$$

$$\tilde{b}_i(k_x, k_y, k_z) = \frac{1}{(2\pi)^3}\int_{-\infty}^{\infty}\int_{-\infty}^{\infty}\int_{-\infty}^{\infty} e^{-ik_xx-ik_yy-ik_zz}b_i(x, y, z)dxdydz$$

The final tumor probability image is obtained by (6-4) shown below based on (4-7).

[Math. 31]

$$\rho_N(r)=e^{v\Delta}b_1(r) \wedge e^{v\Delta}b_2(r) \wedge e^{v\Delta}b_3(r) \wedge \ldots \wedge e^{v\Delta}b_N(r)$$

$$v=\langle (r-r_0)^2 \rangle \quad (6\text{-}4)$$

In (6-4), in order to clearly define v, equality is used for the proportionality relation of v in (5-3).

By calculating the minimum image intensity at each position in the time series measurement image, temporary lobules disappear and permanent tumors remain in the tumor probability image. However, if there is a shift in the measurement area, the tumor may also disappear from the tumor probability image due to the position shifting. This sort of disappearance is inhibited, even when there is a shift in the measurement area, by diffusing the image intensity at each position in the time series measurement image to its surroundings.

VII. Validation using Actual Data

The effectiveness above theories will be validated using clinical experiment data and composite data based on clinical experiment data. Next, four examples, Example 1 through Example 4, will be given.

The subjects in Examples 1 through 3 are all young adults who are considered to be healthy. In the time series clinical experiments, the measurement frequency is 4 to 8 times per person, taking into account the menstrual cycle. All of the data for each person is organized with the same image intensity. Stated differently, the scale of the image intensity is aligned across images, and the maximum and minimum values of image intensity are aligned across images. In the analysis, v=0, which is the most ideal value, is used Example 4 is an example of a simulation when there is cancer. Composite data generated based on clinical experiment data from two patients, one with cancer and the other healthy, were used for validation. More specifically, composite data created by superimposing one clinical experiment data of a cancer patient on each of four experiments worth of time series clinical experiment data of a healthy patient is used.

Figure 8A:
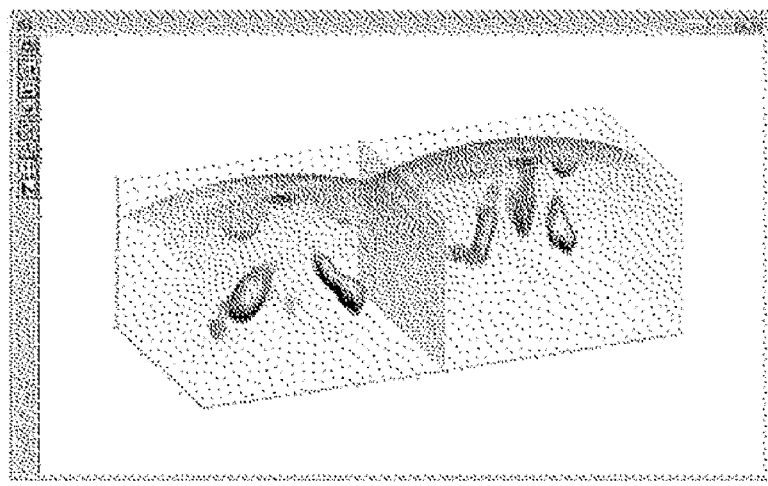
FIG. 8A illustrates a display example of an image according to an embodiment of the present disclosure.
Figure 8B:
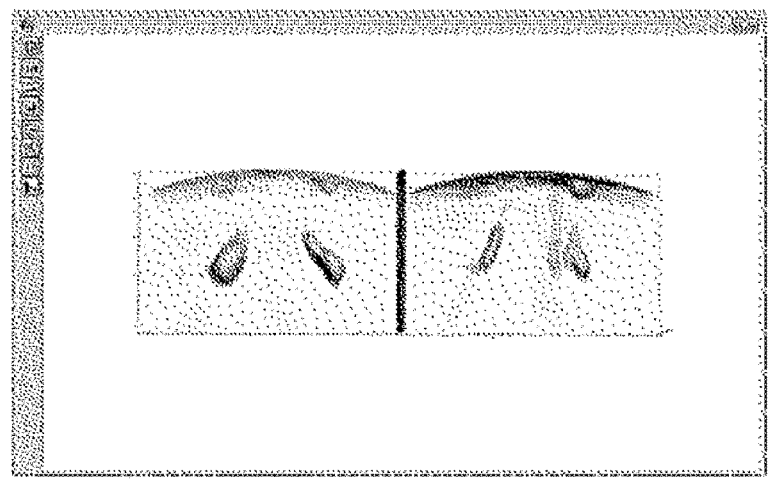
FIG. 8B illustrates a display example of a translucent fluoroscopic image of the interior of a breast viewed in a direction from the bottom of the subject to the top of the subject according to an embodiment of the present disclosure.
Figure 8C:
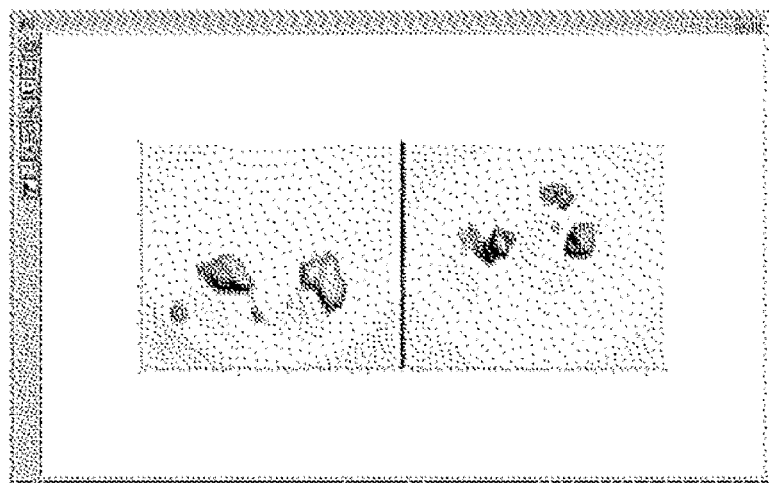
FIG. 8C illustrates a display example of a translucent fluoroscopic image of the interior of a breast viewed from the front of the subject according to an embodiment of the present disclosure.

For example, an image such as the image illustrated in FIG. 8A, FIG. 8B, or FIG. 8C is obtained from clinical data from a single experiment.

FIG. 8A illustrates a display example of an image showing the interior of a breast. As illustrated in FIG. 8A, the interior of the breast is displayed translucently and in three dimensions. The top of the image corresponds to the top of the subject, and the bottom of the image corresponds to the bottom of the subject. The left side of the image corresponds to the right side of the subject, and the right side of the image corresponds to the left side of the subject.

FIG. 8B illustrates a display example of a translucent fluoroscopic image of the interior of a breast viewed in a direction from the bottom of the subject to the top of the subject. The left side of the image corresponds to the right side of the subject, and the right side of the image corresponds to the left side of the subject.

FIG. 8C illustrates a display example of a translucent fluoroscopic image of the interior of a breast viewed from the front of the subject. The left side of the image corresponds to the right side of the subject, and the right side of the image corresponds to the left side of the subject.

A time series of a plurality of images are obtained by obtaining an image like the image illustrated in FIG. 8A, FIG. 8B or FIG. 8C for each measurement. A tumor probability image for identifying tumors and the like is then generated from the time series of the plurality of images.

VII-1. Example 1

Figure 9A:
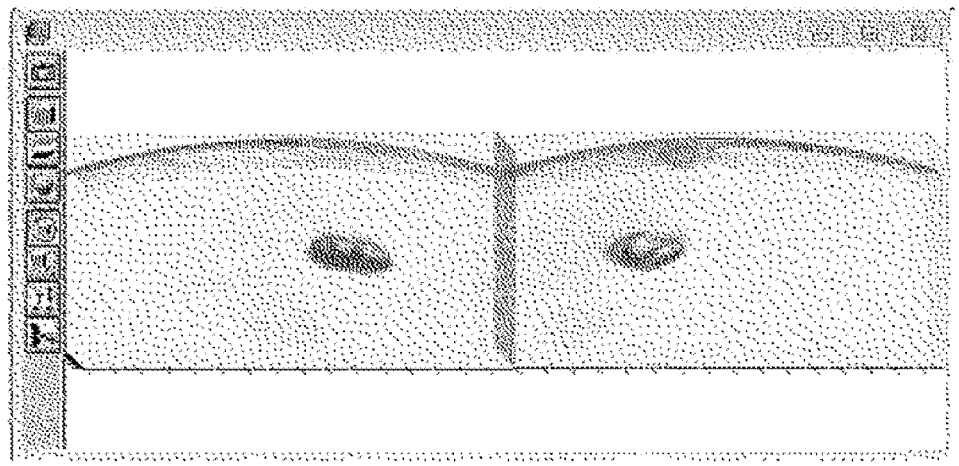
FIG. 9A illustrates a display example according to Example 1 of a reconstructed image obtained from measurement data from January 11.

FIG. 9A illustrates a display example according to Example 1 of a reconstructed image obtained from measurement data from January 11. This image corresponds to $b_1(r)$ described above.

Figure 9B:
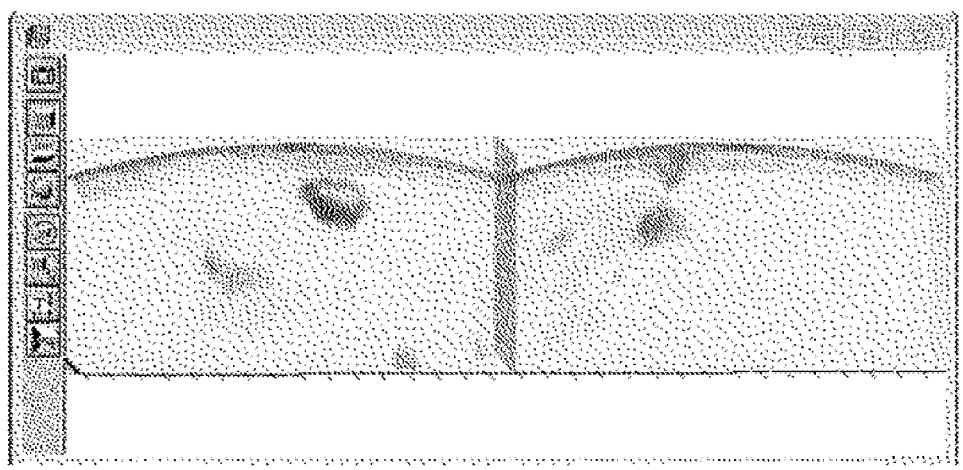
FIG. 9B illustrates a display example according to Example 1 of a reconstructed image obtained from measurement data from January 18.

FIG. 9B illustrates a display example according to Example 1 of a reconstructed image obtained from measurement data from January 18. This image corresponds to $b_2(r)$ described above.

Figure 9C:
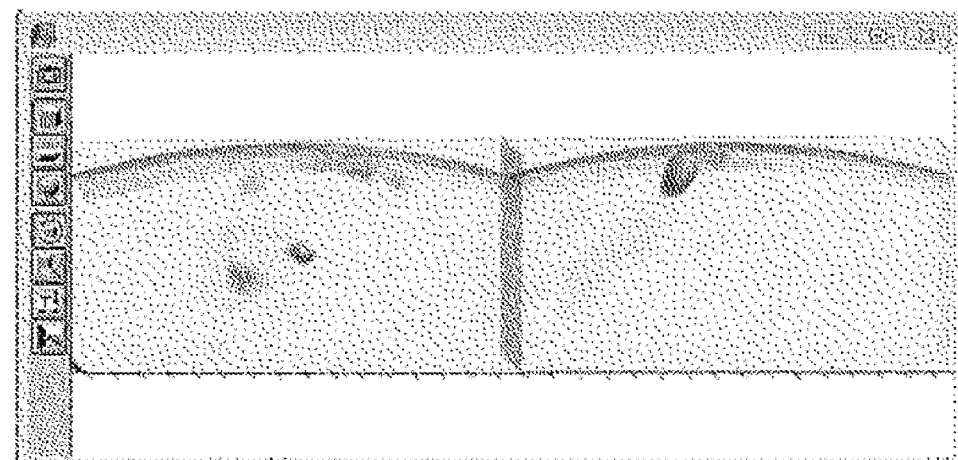
FIG. 9C illustrates a display example according to Example 1 of a reconstructed image obtained from measurement data from January 25.

FIG. 9C illustrates a display example according to Example 1 of a reconstructed image obtained from measurement data from January 25. This image corresponds to $b_3(r)$ described above.

Figure 9D:
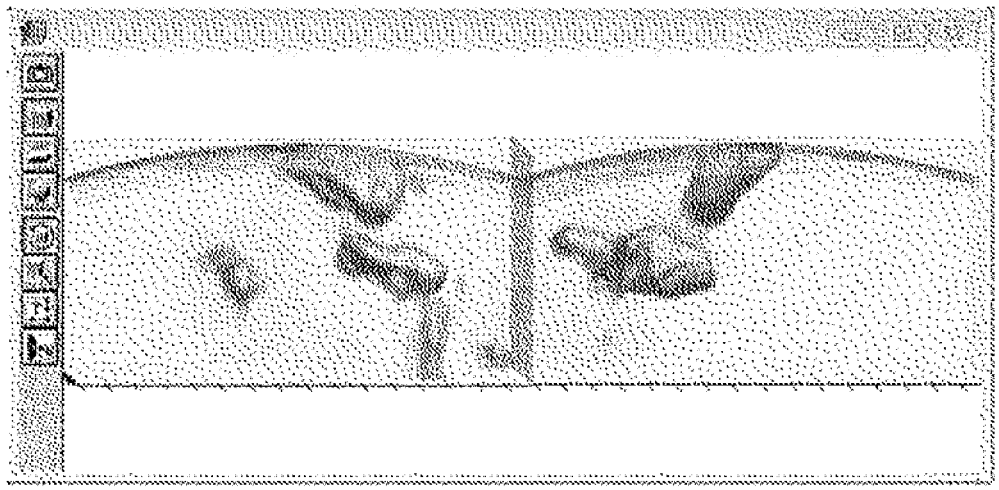
FIG. 9D illustrates a display example according to Example 1 of a reconstructed image obtained from measurement data from February 1.

FIG. 9D illustrates a display example according to Example 1 of a reconstructed image obtained from measurement data from February 1. This image corresponds to $b_4(r)$ described above. In Example 1, February 1 corresponds to the start date of the menstrual cycle.

Figure 9E:
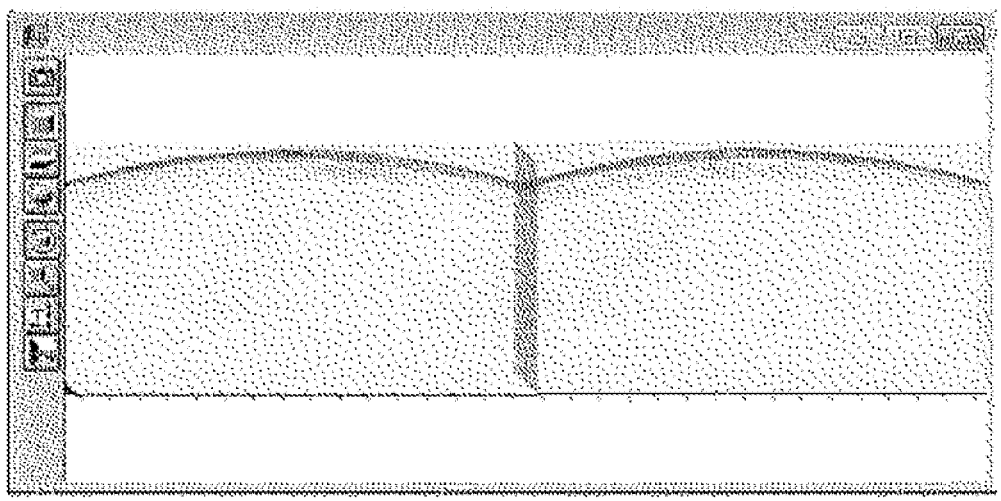
FIG. 9E illustrates a display example according to Example 1 of a tumor probability image.

FIG. 9E illustrates a display example according to Example 1 of a tumor probability image. This image corresponds to $\rho_4(r)$ described above. In Example 1, the tumor probability image identifies that no tumor or the like is seen.

VII-2. Example 2

Figure 10A:
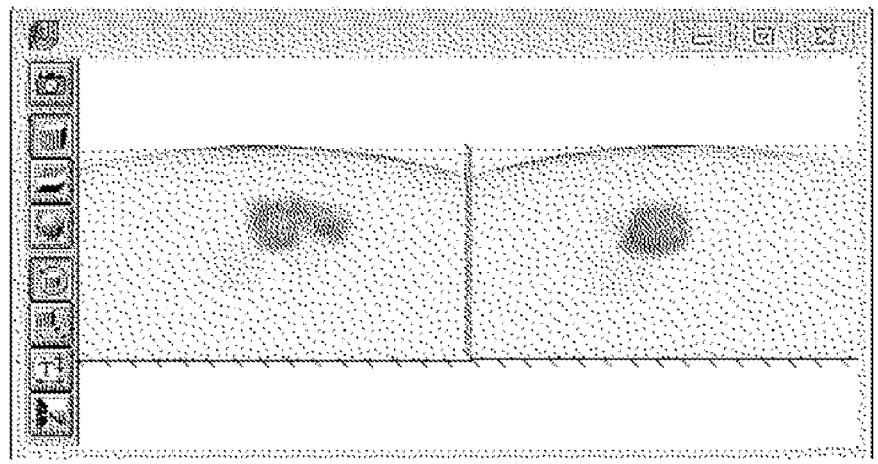
FIG. 10A illustrates a display example according to Example 2 of a reconstructed image obtained from measurement data from June 1.

FIG. 10A illustrates a display example according to Example 2 of a reconstructed image obtained from measurement data from June 1. This image corresponds to $b_1(r)$ described above. In Example 2, June 1 corresponds to the start date of the menstrual cycle.

Figure 10B:
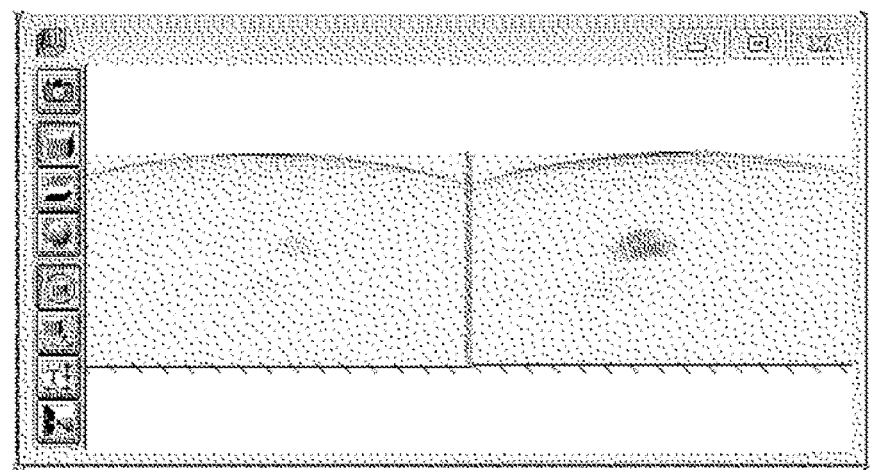
FIG. 10B illustrates a display example according to Example 2 of a reconstructed image obtained from measurement data from June 5.

FIG. 10B illustrates a display example according to Example 2 of a reconstructed image obtained from measurement data from June 5. This image corresponds to $b_2(r)$ described above.

Figure 10C:
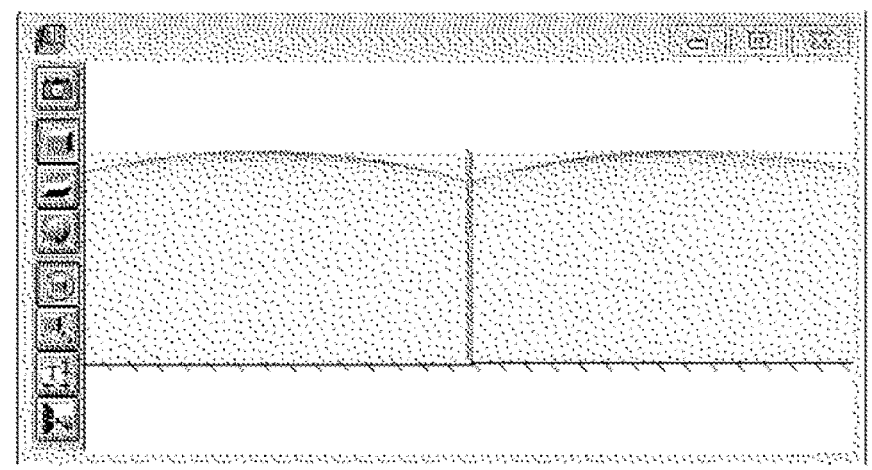
FIG. 10C illustrates a display example according to Example 2 of a reconstructed image obtained from measurement data from June 8.

FIG. 10C illustrates a display example according to Example 2 of a reconstructed image obtained from measurement data from June 8. This image corresponds to $b_3(r)$ described above.

Figure 10D:
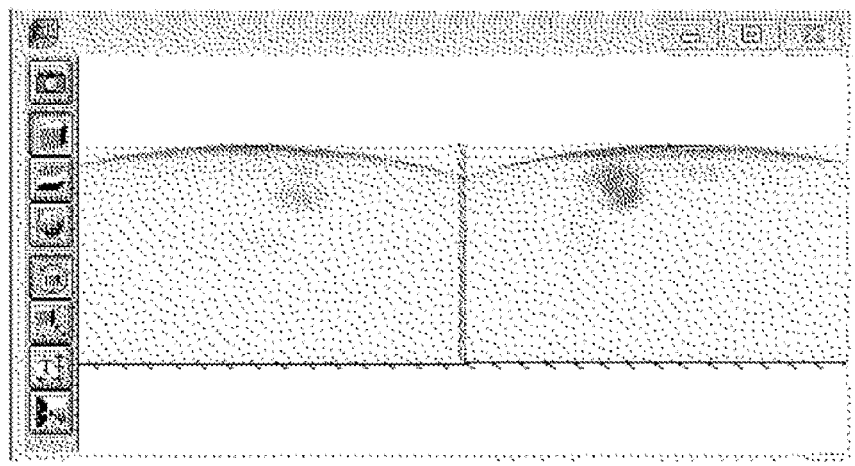
FIG. 10D illustrates a display example according to Example 2 of a reconstructed image obtained from measurement data from June 12.

FIG. 10D illustrates a display example according to Example 2 of a reconstructed image obtained from measurement data from June 12. This image corresponds to $b_4(r)$ described above.

Figure 10E:
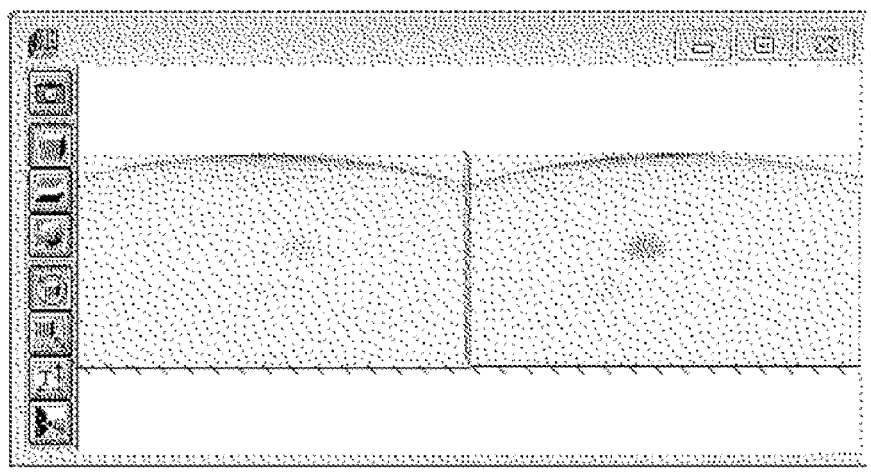
FIG. 10E illustrates a display example according to Example 2 of a reconstructed image obtained from measurement data from June 15.

FIG. 10E illustrates a display example according to Example 2 of a reconstructed image obtained from measurement data from June 15. This image corresponds to $b_5(r)$ described above.

Figure 10F:
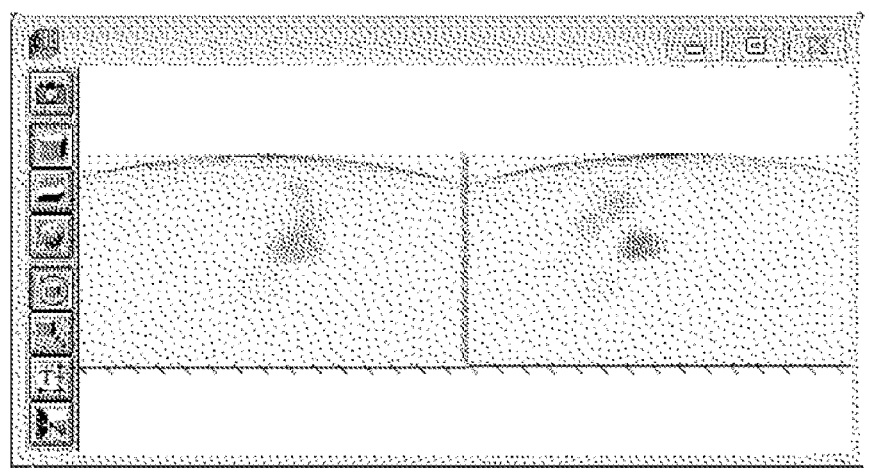
FIG. 10F illustrates a display example according to Example 2 of a reconstructed image obtained from measurement data from June 19.

FIG. 10F illustrates a display example according to Example 2 of a reconstructed image obtained from measurement data from June 19. This image corresponds to $b_6(r)$ described above.

Figure 10G:
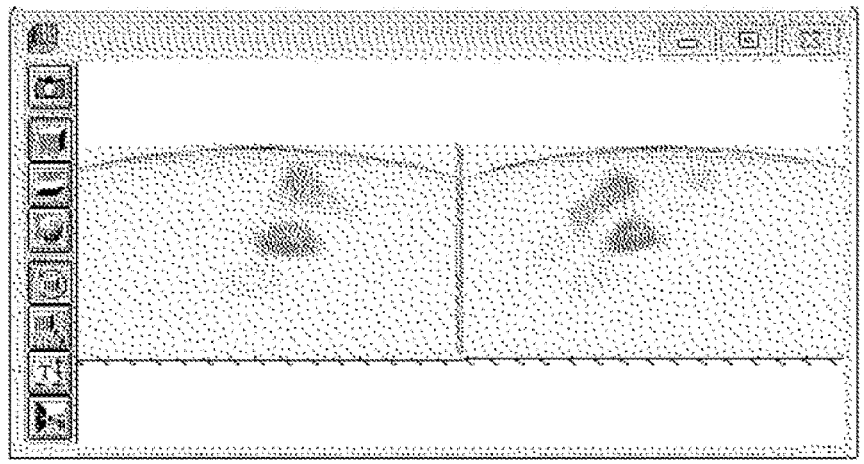
FIG. 10G illustrates a display example according to Example 2 of a reconstructed image obtained from measurement data from June 22.

FIG. 10G illustrates a display example according to Example 2 of a reconstructed image obtained from measurement data from June 22. This image corresponds to $b_7(r)$ described above.

Figure 10H:
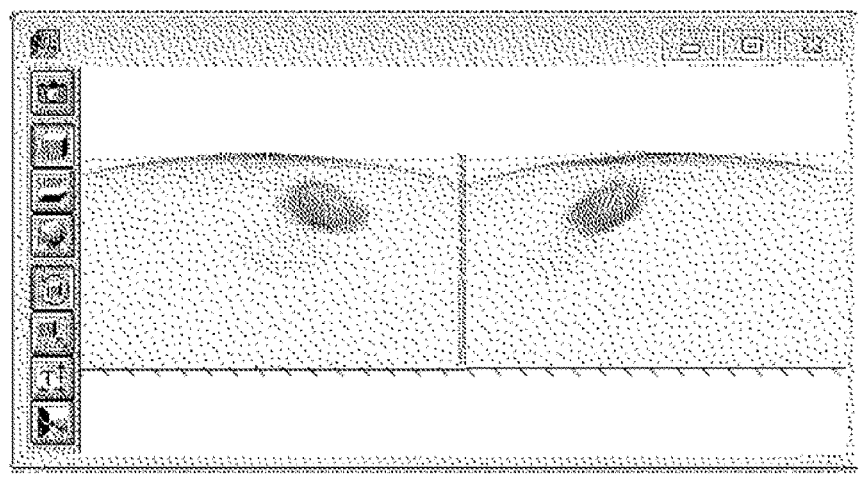
FIG. 10H illustrates a display example according to Example 2 of a reconstructed image obtained from measurement data from June 26.

FIG. 10H illustrates a display example according to Example 2 of a reconstructed image obtained from measurement data from June 26. This image corresponds to WO described above.

Figure 10I:
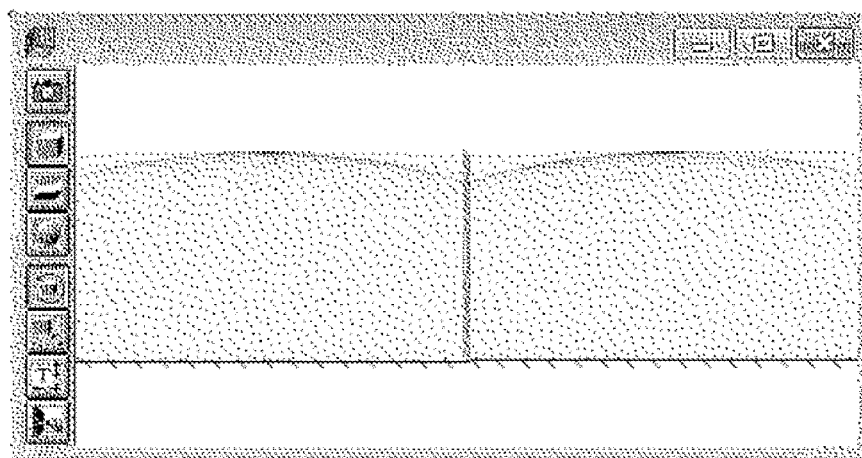
FIG. 10I illustrates a display example according to Example 2 of a tumor probability image.

FIG. 10I illustrates a display example according to Example 2 of a tumor probability image. This image corresponds to $\rho_8(r)$ described above. In Example 2, the tumor probability image identifies that no tumor or the like is seen.

VII-3. Example 3

Figure 11A:
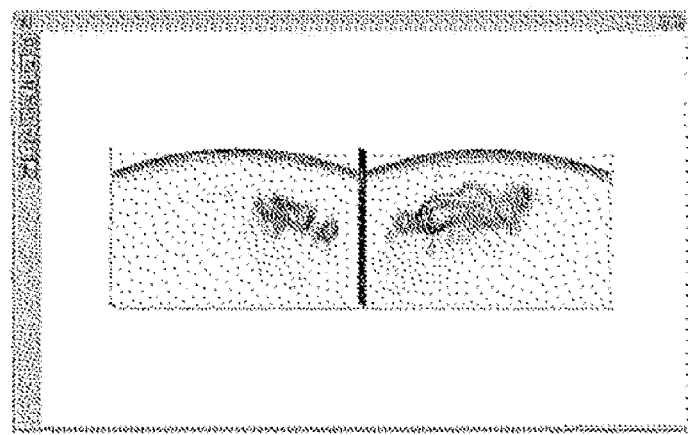
FIG. 11A illustrates a display example according to Example 3 of a reconstructed image obtained from measurement data from October 23.

FIG. 11A illustrates a display example according to Example 3 of a reconstructed image obtained from measurement data from October 23. This image corresponds to $b_1(r)$ described above.

Figure 11B:
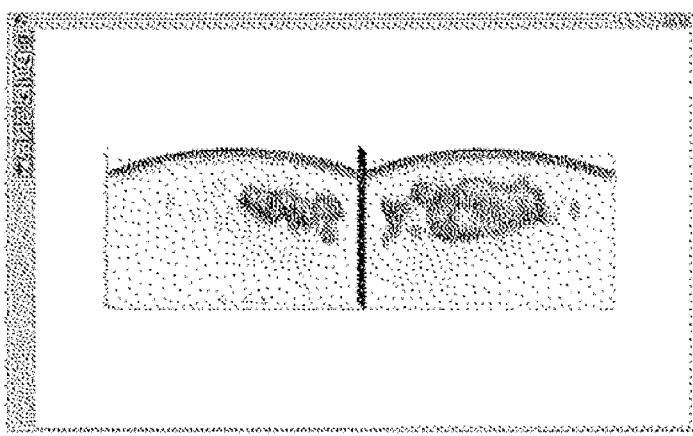
FIG. 11B illustrates a display example according to Example 3 of a reconstructed image obtained from measurement data from October 30.

FIG. 11B illustrates a display example according to Example 3 of a reconstructed image obtained from measurement data from October 30. This image corresponds to $b_2(r)$ described above.

Figure 11C:
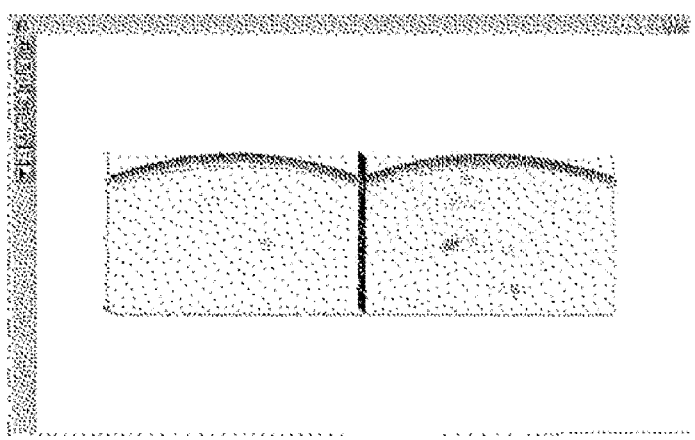
FIG. 11C illustrates a display example according to Example 3 of a reconstructed image obtained from measurement data from November 6.

FIG. 11C illustrates a display example according to Example 3 of a reconstructed image obtained from measurement data from November 6. This image corresponds to $b_3(r)$ described above.

Figure 11D:
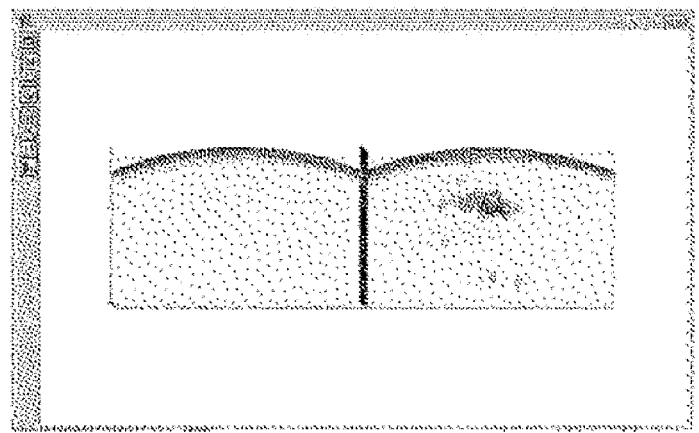
FIG. 11D illustrates a display example according to Example 3 of a reconstructed image obtained from measurement data from November 13.

FIG. 11D illustrates a display example according to Example 3 of a reconstructed image obtained from measurement data from November 13. This image corresponds to $b_4(r)$ described above.

Figure 11E:
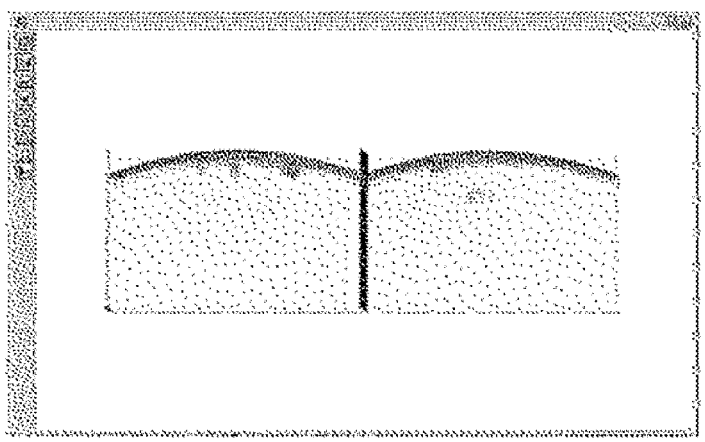
FIG. 11E illustrates a display example according to Example 3 of a reconstructed image obtained from measurement data from November 20.

FIG. 11E illustrates a display example according to Example 3 of a reconstructed image obtained from measurement data from November 20. This image corresponds to $b_5(r)$ described above.

Figure 11F:
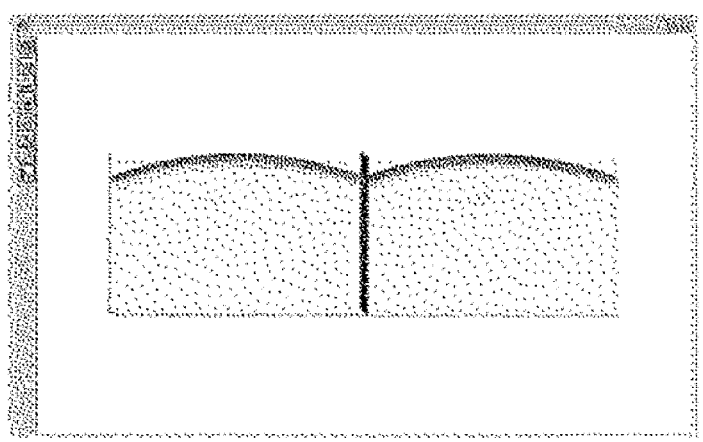
FIG. 11F illustrates a display example according to Example 3 of a reconstructed image obtained from measurement data from November 27.

FIG. 11F illustrates a display example according to Example 3 of a reconstructed image obtained from measurement data from November 27. This image corresponds to $b_6(r)$ described above.

Figure 11G:
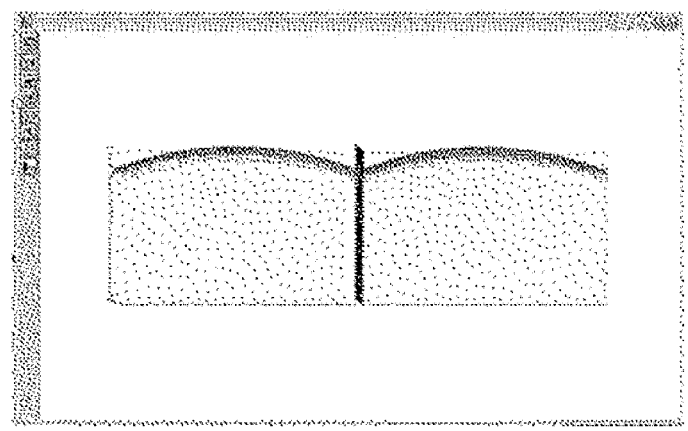
FIG. 11G illustrates a display example according to Example 3 of a reconstructed image obtained from measurement data from December 4.

FIG. 11G illustrates a display example according to Example 3 of a reconstructed image obtained from measurement data from December 4. This image corresponds to $b_7(r)$ described above.

Figure 11H:
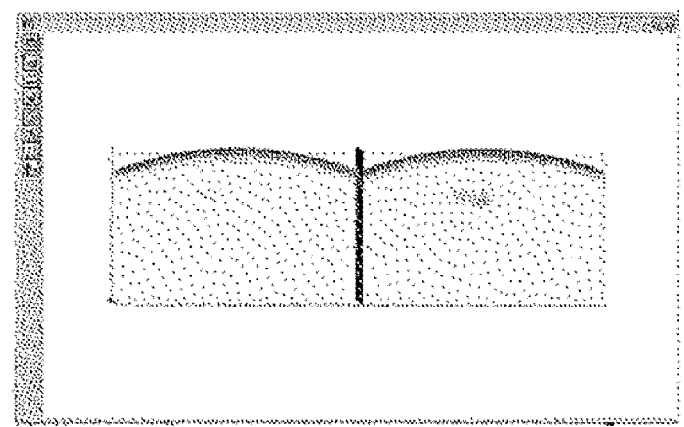
FIG. 11H illustrates a display example according to Example 3 of a reconstructed image obtained from measurement data from December 11.

FIG. 11H illustrates a display example according to Example 3 of a reconstructed image obtained from measurement data from December 11. This image corresponds to WO described above.

Figure 11I:
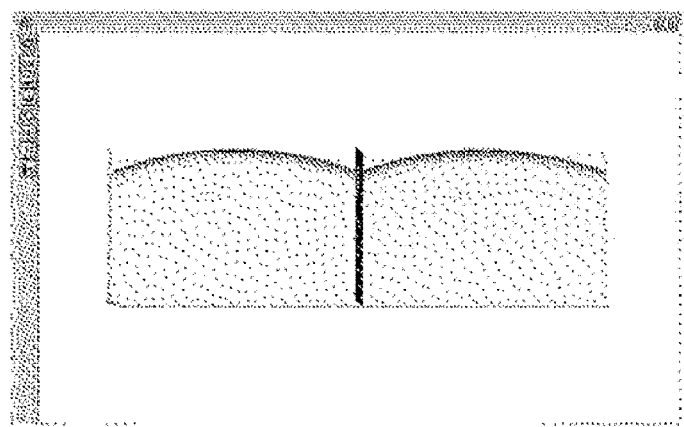
FIG. 11I illustrates a display example according to Example 3 of a tumor probability image.

FIG. 11I illustrates a display example according to Example 3 of a tumor probability image. This image corresponds to $\rho_8(r)$ described above. In Example 3, the tumor probability image identifies that no tumor or the like is seen.

VII-4. Example 4

Figure 12A:
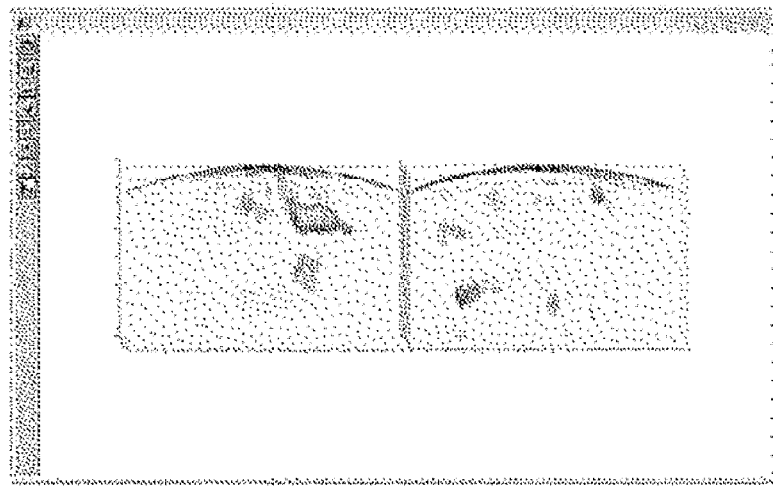
FIG. 12A illustrates a display example according to Example 4 of a reconstructed image obtained from the composite data of the measurement data of the cancer patient and the measurement data of the healthy patient from February 26.

FIG. 12A illustrates a display example according to Example 4 of a reconstructed image obtained from the composite data of the measurement data of the cancer patient and the measurement data of the healthy patient from February 26. This image corresponds to $b_1(r)$ described above.

Figure 12B:
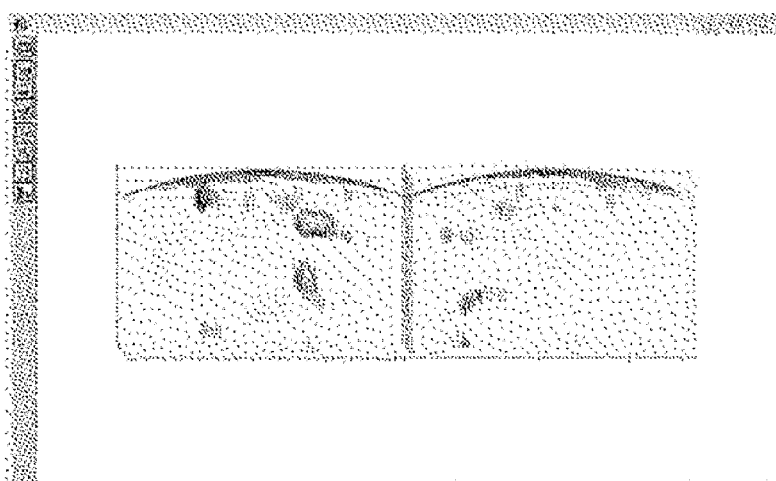
FIG. 12B illustrates a display example according to Example 4 of a reconstructed image obtained from the composite data of the measurement data of the cancer patient and the measurement data of the healthy patient from February 5.

FIG. 12B illustrates a display example according to Example 4 of a reconstructed image obtained from the composite data of the measurement data of the cancer patient and the measurement data of the healthy patient from February 5. This image corresponds to $b_2(r)$ described above.

Figure 12C:
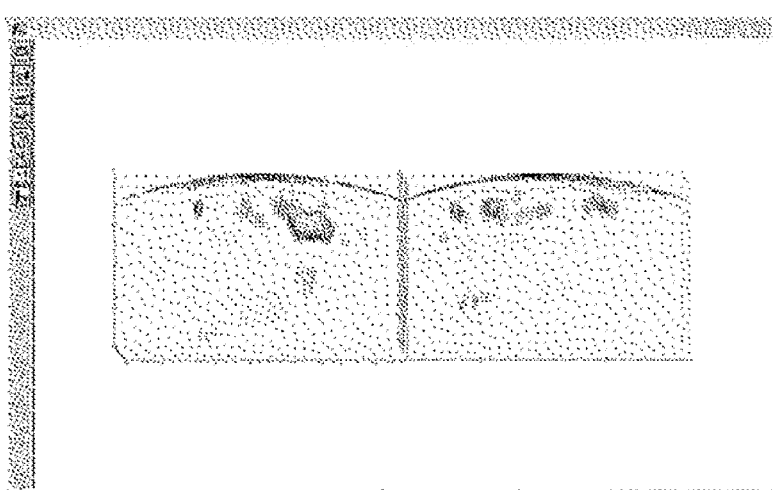
FIG. 12C illustrates a display example according to Example 4 of a reconstructed image obtained from the composite data of the measurement data of the cancer patient and the measurement data of the healthy patient from February 12.

FIG. 12C illustrates a display example according to Example 4 of a reconstructed image obtained from the composite data of the measurement data of the cancer patient and the measurement data of the healthy patient from February 12. This image corresponds to $b_3(r)$ described above.

Figure 12D:
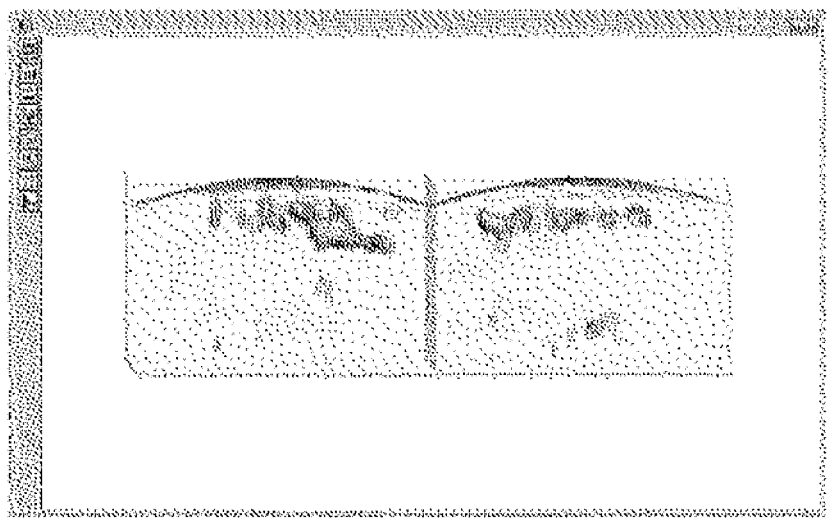
FIG. 12D illustrates a display example according to Example 4 of a reconstructed image obtained from the composite data of the measurement data of the cancer patient and the measurement data of the healthy patient from February 19.

FIG. 12D illustrates a display example according to Example 4 of a reconstructed image obtained from the composite data of the measurement data of the cancer patient and the measurement data of the healthy patient from February 19. This image corresponds to $b_4(r)$ described above. In Example 4, February 19 corresponds to a day that is within 10 days of the start date of the menstrual cycle.

Figure 12E:
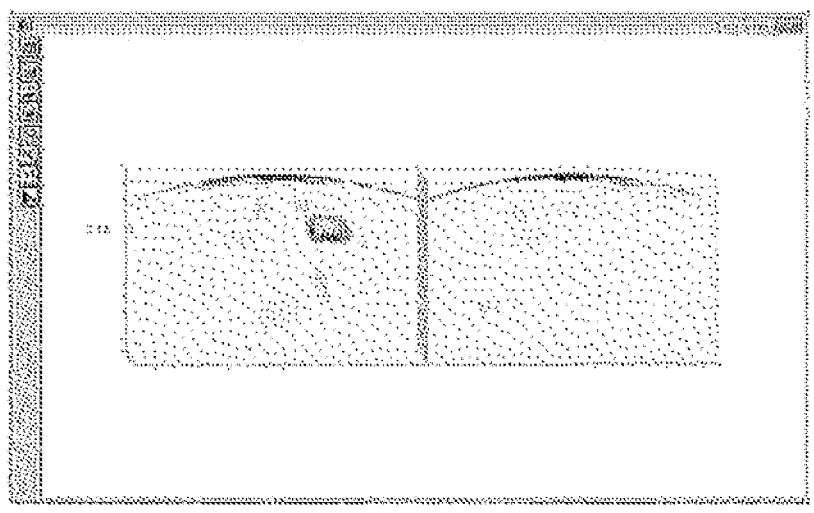
FIG. 12E illustrates a display example according to Example 4 of a tumor probability image.

FIG. 12E illustrates a display example according to Example 4 of a tumor probability image. This image corresponds to $\rho_4(r)$ described above. In Example 4, the tumor probability image identifies that there is tumor on the right side of the breast.

VIII. Configuration and Operation of Scattering Tomography Device

The following is a brief description, based on what has been described above, of the configuration and operation of a scattering tomography device that uses scattered waves of radio waves to generate a reconstructed image showing persistent elements inside an object. Here, a persistent element is an element that does not disappear in a given period of time, for example, four weeks.

Figure 13:
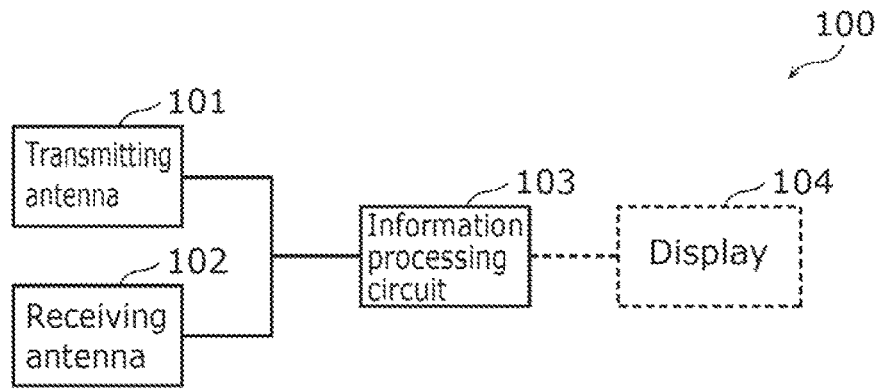
FIG. 13 is a block diagram of the basic configuration of the scattering tomography device according to an embodiment of the present disclosure.

FIG. 13 is diagram of the basic configuration of the scattering tomography device according to the present embodiment. Scattering tomography device 100 illustrated in FIG. 13 includes transmitting antenna 101, receiving antenna 102, and information processing circuit 103. Scattering tomography device 100 may also include display 104.

Transmitting antenna 101 is a circuit that transmits radio waves. More specifically, transmitting antenna 101 transmits radio waves into the interior of an object from outside the object. For example, the radio waves may be microwaves, millimeter waves, or terahertz waves. For example, the living body may be a manufactured object or a natural material. In particular, the object may be a breast. Scattering tomography device 100 may include a plurality of transmitting antenna 101.

Receiving antenna 102 is a circuit that receives radio waves which are, for example, scattered waves of radio waves. More specifically, receiving antenna 102 receives, outside the object, scattered waves of the radio waves transmitted into the interior of the object. Scattering tomography device 100 may include a plurality of receiving antennas 102. Receiving antenna 102 may be disposed in essentially the same position as transmitting antenna 101, and, alternatively, may be disposed in a different position than transmitting antenna 101.

Transmitting antenna 101 and receiving antenna 102 may constitute a multistatic antenna, and, alternatively, may constitute a monostatic antenna.

Information processing circuit 103 is a circuit that performs information processing. More specifically, information processing circuit 103 generates a reconstructed image showing persistent elements inside an object based on a plurality of measurement results obtained by transmitting antenna 101 and receiving antenna 102 on a plurality of days. For example, information processing circuit 103 performs the arithmetic operations indicated in the theory described above when generating a reconstructed image based on the measurement results.

Information processing circuit 103 may be a computer or a processor included in a computer. Information processing circuit 103 may perform the information processing by reading a program from memory and executing the program. Information processing circuit 103 may be a dedicated circuit that generates a reconstructed image showing persistent elements inside the object based on the results of a plurality of measurements taken over a plurality of days.

Information processing circuit 103 may output the generated reconstructed image to display 104 or the like. For example, information processing circuit 103 may display the reconstructed image on display 104 by outputting the reconstructed image to display 104. Alternatively, information processing circuit 103 may output the reconstructed image to a printer (not illustrated in the drawings) and print the reconstructed image via the printer. Alternatively, information processing circuit 103 may transmit the reconstructed image as electronic data to another device (not illustrated in the drawings) via wired or wireless communication.

Display 104 is a display device such as a liquid crystal display. Note that display 104 is an optional element and not a required element. Moreover, display 104 may be an external device that is not included in scattering tomography device 100.

Figure 14:
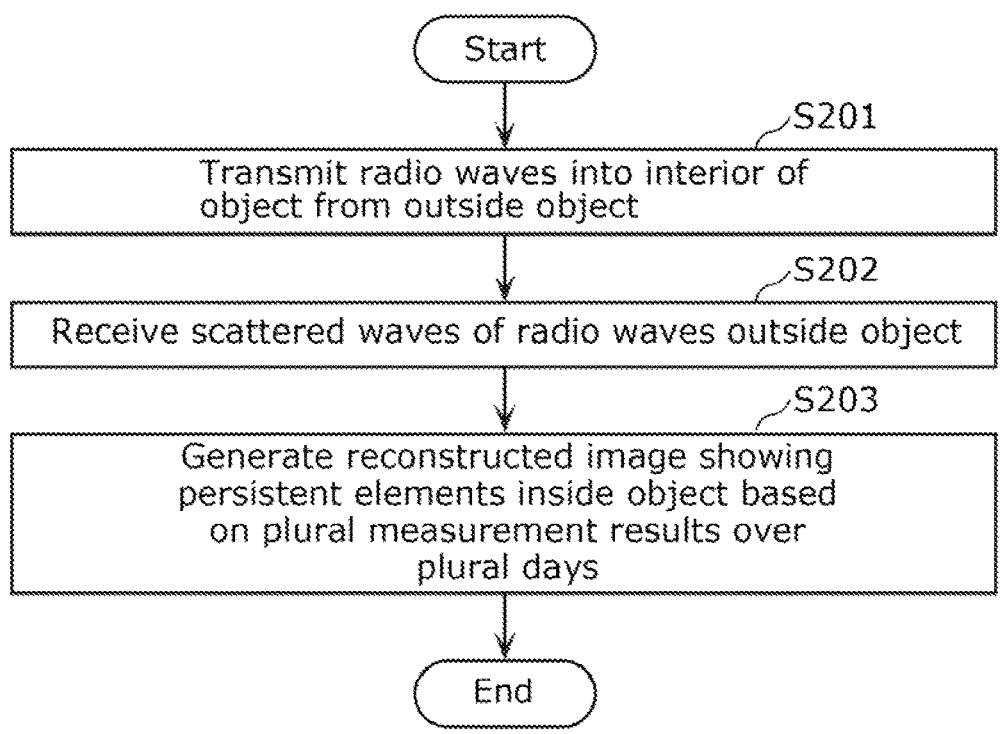
FIG. 14 is a flowchart illustrating the basic operation of the scattering tomography device according to an embodiment of the present disclosure.

FIG. 14 is a flowchart illustrating the basic operation of scattering tomography device 100 illustrated in FIG. 13. Specifically, transmitting antenna 101, receiving antenna 102, and information processing circuit 103 included in scattering tomography device 100 illustrated in FIG. 13 operate as shown in FIG. 14.

First, transmitting antenna 101 transmits radio waves into the interior of an object from outside the object (S201). Next, receiving antenna 102 receives, outside the object, scattered waves of the radio waves transmitted into the interior of the object (S202). Information processing circuit 103 then generates a reconstructed image showing persistent elements inside an object based on a plurality of measurement results obtained by transmitting antenna 101 and receiving antenna 102 on a plurality of days (S203).

When generating a reconstructed image based on a plurality of measurement results, information processing circuit 103 first calculates a scattering field function for each of the plurality of measurement results using the measurement result as a boundary condition. Inputs of the scattering field function are a reception position of the scattered waves and a transmission position of the radio waves, and an output of the scattering field function is an amount of the scattered waves at the reception position. Stated differently, the scattering field function is a function that indicates the amount of scattered waves at the reception position for discretionarily defined transmission and reception positions.

Then, information processing circuit 103 calculates the visualization function based on the scattering field functions calculated for the plurality of measurement results. The visualization function is a function that takes a location to be visualized as an input and outputs an image intensity at the location to be visualized, and is a function defined based on a quantity output from the scattering field function in response to inputting the location to be visualized into the scattering field function as the transmission and reception positions.

Next, information processing circuit 103 generates an intermediate image for each of the measurement results based on the corresponding calculated visualization function, thereby generating a plurality of intermediate images for the plurality of measurement results. Information processing circuit 103 then generates the reconstructed image by calculating the minimum value of the image intensity at each position in the plurality of intermediate images by logical conjunction. Information processing circuit 103 may output the generated reconstructed image to display 104 or the like.

This enables scattering tomography device 100 to calculate an intermediate image that can show elements inside the object, based on the scattering field functions calculated using the measurement results of the scattered waves as boundary conditions. Scattering tomography device 100 can then generate a reconstructed image showing persistent elements inside the object from a plurality of intermediate images obtained using the plurality of measurements taken over a plurality of days.

Accordingly, scattering tomography device 100 can generate a reconstructed image showing persistent elements in the object using scattered waves of radio waves. This makes it possible to identify, for example, whether an element inside the human body is a persistent malignant tumor or other cells that randomly appear and disappear using scattered waves.

For example, information processing circuit 103 may generate the reconstructed image using $P_N(r)=b_1(r) \wedge b_2(r) \wedge \ldots \wedge b_N(r)$, where $P_N(r)$ is the reconstructed image, r is a position, N is a total number of the intermediate images, $b_i$ is the visualization function where i is 1 to N, and $\wedge$ is the logical conjunction.

This enables scattering tomography device 100 to simply generate the reconstructed image by logical conjunctions of the intermediate images corresponding to the outputs of the visualization functions.

Moreover, for example, information processing circuit 103 generates the intermediate image based on the visualization function and a diffusion coefficient, and when generating the intermediate image, increases a spatial scope of diffusion of the image intensity at the location to be visualized in the intermediate image as the diffusion coefficient increases.

This enables scattering tomography device 100 to diffuse the image intensity using a diffusion coefficient. Accordingly, using the diffusion coefficient, scattering tomography device 100 can inhibit persistent elements from disappearing from the reconstructed image due to a shift in the measurement of the scattered waves.

Moreover, for example, information processing circuit 103 may generate the reconstructed image using $P_N(r)=e^{v\Delta}b_1(r)\wedge e^{v\Delta}b_2(r)\wedge \ldots \wedge e^{v\Delta}b_N(r)$, where $P_N(r)$ is the reconstructed image, r is a position, N is a total number of the intermediate images, $b_i$ is the visualization function where i is 1 to N, $e^{v\Delta}b_i(r)$ is the intermediate image where i is 1 to N, v is the diffusion coefficient, $\Delta$ is a two-dimensional Laplace operator corresponding to two directions in which a shift occurs in the measurement of the scattered waves, and $\wedge$ is the logical conjunction.

This enables scattering tomography device 100 to properly diffuse the image intensity using a relational expression based on a probability theory method.

Moreover, for example, information processing circuit 103 may calculate $e^{v\Delta}b_i(r)$ by calculating a Fourier transform of $b_i(r)$, multiplying a result of the Fourier transform by $\exp(-v(k_x^2+k_y^2))$, and calculating an inverse Fourier transform of a result of the multiplication of $\exp(-v(k_x^2+k_y^2))$, where, $k_x$ and $k_y$ in $\exp(-v(k_x^2+k_y^2))$ are two wavenumbers corresponding to the two directions of $b_i$.

This enables scattering tomography device 100 to rapidly and properly diffuse the image intensity.

Moreover, for example, the diffusion coefficient may be defined as a value proportional to a mean squared error of measurement positions of the scattered waves. This enables the diffusion coefficient to be defined based on the magnitude of the error in the measurement position. Scattering tomography device 100 can then appropriately diffuse the image intensity based on the magnitude of the error in the measurement position.

Moreover, for example, the diffusion coefficient may be defined as a value equal to a mean squared error of measurement positions of the scattered waves. This enables the diffusion coefficient to be simply defined based on the magnitude of the error in the measurement position. Scattering tomography device 100 can then appropriately diffuse the image intensity based on the magnitude of the error in the measurement position.

Moreover, for example, the diffusion coefficient may be defined as zero. This enables scattering tomography device 100 to simply generate the reconstructed image by logical conjunctions of the intermediate images corresponding to the outputs of the visualization functions, just like when a diffusion coefficient is not used Moreover, for example, the diffusion coefficient may be defined as a value greater than zero. This enables scattering tomography device 100 to diffuse the image intensity more reliably using a diffusion coefficient greater than zero. Accordingly, by using a diffusion coefficient greater than zero, scattering tomography device 100 can more reliably inhibit persistent elements from disappearing from the reconstructed image due to a shift in the measurement of the scattered waves.

Moreover, for example, in a three-dimensional space of X coordinates, Y coordinates, and Z coordinates, an X coordinate and a Z coordinate of a position of transmitting antenna 101 may be identical to an X coordinate and a Z coordinate of a position of receiving antenna 102, respectively.

The scattering field function may be defined as:

[Math. 32]

$$\varphi(x, y_1, y_2, z, k) = \frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)}$$

$$a(k_x, k_{y_1}, k_{y_2}) e^{i\left\{\sqrt{\left(\sqrt{k^2-k_{y_1}^2}+\sqrt{k^2-k_{y_2}^2}\right)^2 - k_x^2}\right\}z} dk_x dk_y dk_z.$$

Here, x is an X coordinate of the transmission position and the reception position, $y_1$ is a Y coordinate of the transmission position, $y_2$ is a Y coordinate of the reception position, z is a Z coordinate of the transmission position and the reception position, k is a wavenumber of the radio waves, and $k_x$, $k_{y_1}$, and $k_{y_2}$ in the scattering field function are wavenumbers related to x, $y_1$, and $y_2$ in the scattering field function, respectively.

Moreover, $a(k_x, k_{y_1}, k_{y_2})$ is defined as:

[Math. 33]

$$a(k_x, k_{y_1}, k_{y_2}) = \sum_I e^{ik_x x_I} e^{-i\left\{\sqrt{\left(\sqrt{k^2-k_{y_1}^2}+\sqrt{k^2-k_{y_2}^2}\right)^2-k_x^2}\right\}z_I} \Phi(x_I, k_{y_1}, k_{y_2}, k)$$

Here, I is an index of the transmission position and the reception position at which transmitting antenna 101 and receiving antenna 102 are present, $x_I$ is an X coordinate of the transmission position and the reception position at which transmitting antenna 101 and receiving antenna 102 are present, and $z_I$ is a Z coordinate of the transmission position and the reception position at which transmitting antenna 101 and receiving antenna 102 are present.

Moreover, $$\tilde{\Phi}(x, k_{y_1}, k_{y_2}, k) \qquad \text{[Math. 34]}$$

expresses a Fourier transform image related to $y_1$, $y_2$, and t in $\Phi(x, y_1, y_2, t)$ expressing a measurement result at x, $y_i$, $y_z$, and t.

The visualization function may be defined as:

[Math. 35]

$$\rho(r) = \rho(x, y, z) =$$

$$\int_0^\infty \varphi(x, y, y, z, k) dk = \frac{1}{(2\pi)^3} \int_{-\infty}^{\infty}\int_{-\infty}^{\infty}\int_{-\infty}^{\infty} e^{-i(k_x x + k_{y_1} y + k_{y_2} y)} a(k_x, k_{y_1}, k_{y_2})$$

$$e^{i\left\{\sqrt{\left(\sqrt{k^2-k_{y_1}^2}+\sqrt{k^2-k_{y_2}^2}\right)^2-k_x^2}\right\}z} dk_x dk_{y_1} dk_{y_2} dk$$

where x, y, and z in the visualization function are an X coordinate, a Y coordinate, and a Z coordinate of the location to be visualized, respectively.

This enables scattering tomography device 100 to properly generate intermediate images based on the above scattering field function and the above visualization function. The above scattering field function and the above visualization function can be properly defined based on the fact that the X coordinate and the Z coordinate of the position of transmitting antenna 101 are the same as the X coordinate and the Z coordinate of the position of receiving antenna 102, respectively.

For example, the elements, equations, variables and the like presented in the present embodiment may be applied to transmitting antenna 101, receiving antenna 102, information processing circuit 103, the scattering field functions, the visualization functions, and the parameters and the like presented in the above basic configuration and basic operation.

The scattering field functions and the visualization function and the like presented in the present embodiment may be applied in a modified form as appropriate. For example, other formulas that include substantially the same content as the formulas described above may be used, and other formulas that are derived based on the theories described above may be used.

Figure 15:
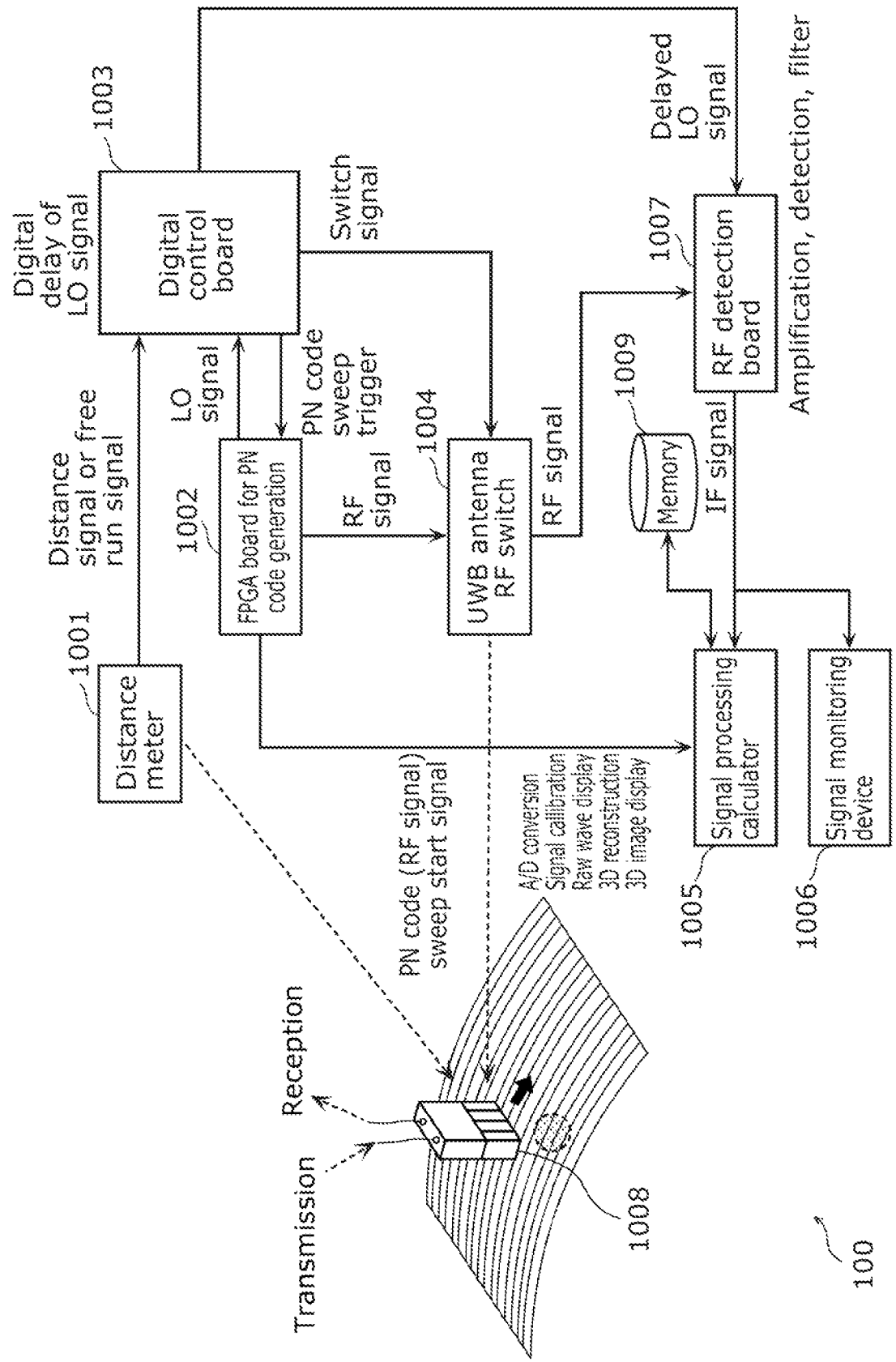
FIG. 15 is a schematic diagram illustrating a detailed configuration of the scattering tomography device according to an embodiment of the present disclosure.

FIG. 15 is a schematic diagram illustrating a detailed configuration of scattering tomography device 100 illustrated in FIG. 13.

Transmitting antenna 101 and receiving antenna 102 of scattering tomography device 100 illustrated in FIG. 13 may be included in multistatic antenna array 1008. Information processing circuitry 103 of scattering tomography device 100 illustrated in FIG. 13 may correspond to one or more of the plurality of elements illustrated in FIG. 15. More specifically, for example, information processing circuit 103 may correspond to signal processing calculator 1005. Display 104 illustrated in FIG. 13 may correspond to signal monitoring device 1006.

The microwave signal used in scattering tomography device 100 is a pseudo-random time-series signal (pseudo noise code (PN code)) with a frequency component of DC to 20 GHz. This signal is output from FPGA board 1002 for PN code generation. More specifically, there are two types of this signal. One type of the signal (local oscillator signal (LO signal)) is transmitted to an RF detection circuit (RF detection board 1007) through a delay circuit (digital control board 1003).

The other type of the signal (radio frequency signal (RF signal)) is transmitted to and radiated from a transmitting microwave UWB antenna of multistatic antenna array 1008. Scattered signals of the microwaves are received by the receiving UWB antenna of multistatic antenna array 1008 and transmitted to the RF detection circuit (RF detection board 1007). Here, the signals to be transmitted and received pass through an antenna element selection switch (UWB antenna RF switch 1004).

The signal to be delayed (the LO signal) is delayed by $1/2^n$ (n is an integer greater than 2) times the amount of time it takes for the PN code value to change. The detected signal is A/D converted by signal processing calculator 1005 as an intermediate frequency signal (IF signal) and stored. The information indicating the detected signal may be displayed on signal monitoring device 1006.

The timing of these series of operations is controlled by a microprocessor in digital control board 1003 so as to synchronize with a signal (distance signal or free run signal) from distance meter 1001. For example, the microprocessor in digital control board 1003 transmits a switch signal and a PN code sweep trigger and the like.

Signal processing calculator 1005 performs three-dimensional reconstruction using the A/D converted and stored signals, and displays three-dimensional images. Signal processing calculator 1005 may also perform signal calibration. Signal processing calculator 1005 may also display the raw waveform.

For example, signal processing calculator 1005 stores a plurality of three-dimensional images in memory 1009 by storing the three-dimensional image obtained by each measurement in memory 1009. These three-dimensional images correspond to the time series measurement images described above. Signal processing calculator 1005 uses these three-dimensional images to generate a final tumor probability image and displays the generated tumor probability image on signal monitoring device 1006 or the like.

Note that the configuration illustrated in FIG. 15 is merely one example; the configuration of scattering tomography device 100 is not limited to the configuration illustrated in FIG. 15. Some elements in the configuration illustrated in FIG. 15 may be omitted or modified.

Supplemental Information

Hereinbefore, an aspect of the scattering tomography device has been described based on an embodiment, but aspects of the scattering tomography device are not limited to the embodiment. Various modifications conceivable by those skilled in the art may be made to the embodiment, and elements in the embodiment may be combined discretionarily. For example, a process executed by a specific element in the embodiment may be executed by a different element instead. Moreover, the processing order of the processes may be changed, and the processes may be performed in parallel.

Although the above description presents an example of discriminating between lobules and tumors in the breast in microwave mammography, the application of the scattering tomography device presented in the embodiment is not limited to this example. Scattering tomography devices can extract persistent elements in an object without destroying the object, and can be applied with respect to other objects and other elements that have a relationship similar to the relationship between a breast and a tumor.

A scattering tomography method including steps performed by the elements included in the scattering tomography device may be executed by an arbitrary device or system. For example, part or all of the scattering tomography method may be executed by a computer including, for example, a processor, memory, and an input/output circuit. In such cases, the scattering tomography method may be executed by a program for causing a computer to execute the scattering tomography method being executed by the computer.

The program may be recorded on a non-transitory computer-readable recording medium.

Each of the elements of the scattering tomography device may be configured in the form of dedicated hardware, in the form of general-purpose hardware that executes the above program or the like, or any combination thereof. For example, the general-purpose hardware may be configured in the form of memory on which a program is recorded and a general-purpose processor that reads the program from the memory and executes the program. Here, the memory may be semiconductor memory or a hard disk, and the general-purpose processor may be a central processing unit (CPU) or the like.

The dedicated hardware may be configured in the form of memory and a dedicated processor or the like. For example, the dedicated processor may reference the memory for recording the measurement data and execute the scattering tomography method described above.

Each of the elements of the scattering tomography device may be an electrical circuit. The electrical circuits may collectively form a single electrical circuit and, alternatively, may form individual electrical circuits. These electrical circuits may correspond to dedicated hardware or general-purpose hardware that executes the above program, for example.

INDUSTRIAL APPLICABILITY

One aspect of the present disclosure useful as a scattering tomography device and the like that generates an image of the interior of an object using scattered waves of radio waves, and is applicable in, for example, geophysical prospecting or medical diagnosis.

REFERENCE SIGNS LIST 100 scattering tomography device
101 transmitting antenna
102 receiving antenna
103 information processing circuit
104 display
401 antenna array
1001 distance meter
1002 FPGA board for PN code generation
1003 digital control board
1004 UWB antenna RF switch
1005 signal processing calculator
1006 signal monitoring device
1007 RF detection board
1008 multistatic antenna array
1009 memory

The invention claimed is:

1. A scattering tomography device comprising:
a transmitting antenna that transmits radio waves into an interior of an object from outside the object;
a receiving antenna that receives, outside the object, scattered waves of the radio waves transmitted into the interior of the object by the transmitting antenna; and
an information processing circuit that obtains a measurement result of the scattered waves on each of a plurality of days to obtain measurement results over a plurality of days, and generates a reconstructed image showing a persistent element inside the object based on the measurement results,
wherein the information processing circuit:
calculates, for each of the measurement results and using the measurement result as a boundary condition, a scattering field function that takes a transmission position of the radio waves and a reception position of the scattered waves as inputs and outputs an amount of the scattered waves at the reception position;
calculates, for each of the measurement results, a visualization function that takes a location to be visualized as an input and outputs an image intensity at the location to be visualized, and is defined based on the amount output from the scattering field function in response to inputting the location to be visualized into the scattering field function as the transmission position and the reception position;
generates an intermediate image for each of the measurement results based on the visualization function to generate intermediate images for the measurement results; and
generates the reconstructed image by calculating a minimum value of the image intensity at each position in the intermediate images using a logical conjunction.

2. The scattering tomography device according to claim 1, wherein the information processing circuit generates the reconstructed image using $P_N(r)=b_1(r) \wedge \ldots \wedge b_N(r) \wedge \ldots \wedge b_N(r)$, where $P_N(r)$ is the reconstructed image, r is a position, N is a total number of the intermediate images, $b_i$ is the visualization function where i is 1 to N, and $\wedge$ is the logical conjunction.

3. The scattering tomography device according to claim 1, wherein the information processing circuit:
generates the intermediate image based on the visualization function and a diffusion coefficient; and
when generating the intermediate image, increases a spatial scope of diffusion of the image intensity at the location to be visualized in the intermediate image as the diffusion coefficient increases.

4. The scattering tomography device according to claim 3, wherein the information processing circuit generates the reconstructed image using $P_N(r)=e^{v\Delta}b_1(r) \wedge e^{v\Delta}b_2(r) \wedge \ldots \wedge e^{v\Delta}b_N(r)$, where $P_N(r)$ is the reconstructed image, r is a position, N is a total number of the intermediate images, $b_i$ is the visualization function where i is 1 to N, $e^{v\Delta}b_i(r)$ is the intermediate image where i is 1 to N, v is the diffusion coefficient, $\Delta$ is a two-dimensional Laplace operator corresponding to two directions in which a shift occurs in the measurement of the scattered waves, and $\wedge$ is the logical conjunction.

5. The scattering tomography device according to claim 4, wherein the information processing circuit calculates $e^{v\Delta}b_i(r)$ by calculating a Fourier transform of $b_i(r)$, multiplying a result of the Fourier transform by $\exp(-v(k_x^2+k_y^2))$, and calculating an inverse Fourier transform of a result of the multiplication of $\exp(-v(k_x^2+k_y^2))$, where $k_x$ and $k_y$ in $\exp(-v(k_x^2+k_y^2))$ are two wavenumbers corresponding to the two directions of $b_i$.

6. The scattering tomography device according to claim 3, wherein the diffusion coefficient is defined as a value proportional to a mean squared error of measurement positions of the scattered waves.

7. The scattering tomography device according to claim 3, wherein the diffusion coefficient is defined as a value equal to a mean squared error of measurement positions of the scattered waves.

8. The scattering tomography device according to claim 3, wherein the diffusion coefficient is defined as zero.

9. The scattering tomography device according to claim 3, wherein the diffusion coefficient is defined as a value greater than zero.

10. The scattering tomography device according to claim 1, wherein in a three-dimensional space of X coordinates, Y coordinates, and Z coordinates, an X coordinate and a Z coordinate of a position of the transmitting antenna are identical to an X coordinate and a Z coordinate of a position of the receiving antenna, respectively,
the scattering field function is defined as:

[Math. 1]

$$\varphi(x, y_1, y_2, z, k) = \frac{1}{(2\pi)^3} \int_{-\infty}^{\infty}\int_{-\infty}^{\infty}\int_{-\infty}^{\infty} e^{-i(k_x x + k_{y_1} y_1 + k_{y_2} y_2)}$$

$$a(k_x, k_{y_1}, k_{y_2}) e^{i\left\{\sqrt{\left(\sqrt{k^2-k_{y_1}^2}+\sqrt{k^2-k_{y_2}^2}\right)^2 - k_x^2}\right\}z} dk_x dk_{y_1} dk_{y_2}$$

where x is an X coordinate of the transmission position and the reception position, $y_1$ is a Y coordinate of the transmission position, $y_2$ is a Y coordinate of the reception position, z is a Z coordinate of the transmission position and the reception position, k is a wavenumber of the radio waves, and $k_x$, $k_{y1}$, and $k_{y2}$ in the scattering field function are wavenumbers related to x, $y_1$, and $y_2$ in the scattering field function, respectively, a ($k_x$, $k_{y1}$, $k_{y2}$) is defined as:

[Math. 2]

$$a(k_x, k_{y_1}, k_{y_2}) = \sum_I e^{ik_x x_I} e^{-i\left\{\sqrt{\left(\sqrt{k^2-k_{y_1}^2}+\sqrt{k^2-k_{y_2}^2}\right)^2 - k_x^2}\right\} z_I} \tilde{\Phi}(x_I, k_{y_1}, k_{y_2}, k)$$

where I is an index of the transmission position and the reception position at which the transmitting antenna and the receiving antenna are present, $x_I$ is an X coordinate of the transmission position and the reception position at which the transmitting antenna and the receiving antenna are present, and $z_I$ is a Z coordinate of the transmission position and the reception position at which the transmitting antenna and the receiving antenna are present, $$\tilde{\Phi}(x, k_{y_1}, k_{y_2}, k) \qquad [\text{Math. 3}]$$

expresses a Fourier transform image related to $y_1$, $y_2$, and t in $\Phi(x, y_1, y_2, t)$ expressing a measurement result at x, $y_1$, $y_2$, and t, and the visualization function is defined as:

[Math. 4]

$$\rho(r) =$$

$$\rho(x, y, z) = \int_0^\infty \varphi(x, y, y, z, k) dk = \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)}$$

$$a(k_x, k_{y_1}, k_{y_2}) e^{i\left\{\sqrt{\left(\sqrt{k^2-k_{y_1}^2}+\sqrt{k^2-k_{y_2}^2}\right)^2 - k_x^2}\right\} z} dk_x dk_{y_1} dk_{y_2} dk$$

where x, y, and z in the visualization function are an X coordinate, a Y coordinate, and a Z coordinate of the location to be visualized, respectively.

11. A scattering tomography method comprising:

transmitting, by a transmitting antenna, radio waves into an interior of an object from outside the object;

receiving outside the object, by a receiving antenna, scattered waves of the radio waves transmitted into the interior of the object by the transmitting antenna; and obtaining a measurement result of the scattered waves on each of a plurality of days to obtain measurement results over a plurality of days, and generating a reconstructed image showing a persistent element inside the object based on the measurement results, wherein the obtaining of measurement results and generating of a reconstructed image includes:

calculating, for each of the measurement results and using the measurement result as a boundary condition, a scattering field function that takes a transmission position of the radio waves and a reception position of the scattered waves as inputs and outputs an amount of the scattered waves at the reception position;

calculating, for each of the measurement results, a visualization function that takes a location to be visualized as an input and outputs an image intensity at the location to be visualized, and is defined based on the amount output from the scattering field function in response to inputting the location to be visualized into the scattering field function as the transmission position and the reception position;

generating an intermediate image for each of the measurement results based on the visualization function to generate intermediate images for the measurement results; and generating the reconstructed image by calculating a minimum value of the image intensity at each position in the intermediate images using a logical conjunction.

\* \* \* \* \*